United States Patent
Yuan et al.

(10) Patent No.: US 11,848,719 B2
(45) Date of Patent: Dec. 19, 2023

(54) METHOD FOR REPORTING MEASUREMENT RESULT OF INTERFERENCE MEASUREMENT AND APPARATUS

(71) Applicant: HUAWEI TECHNOLOGIES CO., LTD., Shenzhen (CN)

(72) Inventors: Shitong Yuan, Chengdu (CN); Fengwei Liu, Chengdu (CN); Lei Chen, Shenzhen (CN); Jing Qiu, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 447 days.

(21) Appl. No.: 17/213,803

(22) Filed: Mar. 26, 2021

(65) Prior Publication Data

US 2021/0218484 A1     Jul. 15, 2021

Related U.S. Application Data

(63) Continuation of application No. PCT/CN2019/107319, filed on Sep. 23, 2019.

(30) Foreign Application Priority Data

Sep. 28, 2018  (CN) .................. 201811142547.X

(51) Int. Cl.
*H04B 17/345* (2015.01)
*H04W 24/10* (2009.01)

(52) U.S. Cl.
CPC .......... *H04B 17/345* (2015.01); *H04W 24/10* (2013.01)

(58) Field of Classification Search
None
See application file for complete search history.

(56) References Cited

U.S. PATENT DOCUMENTS

| 2007/0213011 A1 | 9/2007 | Kim et al. |
| 2010/0216394 A1 | 8/2010 | Shin et al. |

(Continued)

FOREIGN PATENT DOCUMENTS

| CN | 101529733 A | 9/2009 |
| CN | 107294583 A | 10/2017 |
| CN | 107734538 A | 2/2018 |
| CN | 107734560 A | 2/2018 |
| CN | 108289311 A | 7/2018 |
| EP | 3007483 A1 | 4/2016 |

(Continued)

OTHER PUBLICATIONS

Huawei, Overview consideration on RAN1 IAB aspects. 3GPP TSG-RAN WG2 #AH1807, Montreal, Canada, Jul. 2-Jul. 6, 2018, R2-1810695, 3 pages.

(Continued)

*Primary Examiner* — Christine T Duong
(74) *Attorney, Agent, or Firm* — HAUPTMAN HAM, LLP

(57) ABSTRACT

This application provides a method for reporting a measurement result of interference measurement, to implement interference management performed by a parent node on a child node in an IAB system. The method includes: performing, by a second node, interference measurement to obtain one or more measurement results, the interference measurement includes interference measurement in a first mode and/or interference measurement in a second mode, and sending, by the second node, an uplink signal to the first node, the uplink signal includes the one or more measurement results, the uplink signal includes an indication field, and the indication field is used to indicate a mode of interference measurement corresponding to each of the one or more measurement results.

20 Claims, 6 Drawing Sheets

(56) References Cited

U.S. PATENT DOCUMENTS

| | | |
|---|---|---|
| 2012/0015659 A1 | 1/2012 | Kalyani et al. |
| 2013/0077502 A1 | 3/2013 | Gainey et al. |
| 2013/0344801 A1 | 12/2013 | Redana et al. |
| 2014/0064158 A1 | 3/2014 | Timus |
| 2015/0031284 A1 | 1/2015 | Pitakdumrongkija et al. |
| 2018/0262254 A1 | 9/2018 | Lee et al. |
| 2019/0363810 A1* | 11/2019 | Luo ................... H04J 11/0053 |

FOREIGN PATENT DOCUMENTS

| | | | |
|---|---|---|---|
| EP | 3425817 A1 | 1/2019 | |
| EP | 3499778 P | 6/2019 | |
| KR | 10-1532223 * | 6/2015 | ............... H04B 7/26 |
| WO | 2016186409 A1 | 11/2016 | |
| WO | 2018128570 A1 | 7/2018 | |

OTHER PUBLICATIONS

Extended European Search Report issued in corresponding European Application No. 19867990.4, dated Oct. 7, 2021, pp. 1-11, European Patent Office, Munich, Germany.

Zte et al.:"Discussion on physical layer enhancements for IAB 3GPP",TSG RAN WG1 Meeting #94 R1-1809103 ,Aug. 24, 2018,total 10 pages.

Huawei Overview consideration on RAN1 IAB aspects 3GPPTSG-RAN WG2 #103 R2-1812758,Aug. 24, 2018 ,total 3 pages.

Sony Discussion on NR enhancements to support IAB 3GPP TSGRAN WGI Meeting #93 R1-1806572,May 25, 2018, total 4 pages.

Chinese Office Action issued in corresponding Chinese Application No. 201811142547.X, dated Dec. 16, 2020, pp. 1-8.

International Search Report issued in corresponding International Application No. PCT/CN2019/107319, dated Dec. 3, 2019, pp. 1-9.

Samsung, Interference measurement table for beam coordination. 3GPP TSG-RAN WG1 Meeting#89, Hangzhou, China, May 9-15, 2017, R1-1709041, 6 pages.

LG-Nortel, Self Interference Considerations in Relay Node. 3GPP TSG RAN1 #56 , Athens, Greece, Feb. 9-Feb. 13, 2009, R1-090565, 3 pages.

Zte, IAB scenarios and evaluations. 3GPP TSG RAN WG1 Meeting #93, Busan, Korea, May 21-25, 2018, R1-1806025, 6 pages.

Chinese Office Action issued in corresponding Chinese Application No. 201811142547.X, dated Jun. 27, 2022, pp. 1-10.

* cited by examiner

METHOD FOR REPORTING MEASUREMENT RESULT OF INTERFERENCE MEASUREMENT AND APPARATUS

CROSS-REFERENCE TO RELATED APPLICATIONS

This application is a continuation of International Application No. PCT/CN2019/107319, filed on Sep. 23, 2019, which claims priority to Chinese Patent Application No. 201811142547.X, filed on Sep. 28, 2018. The disclosures of the aforementioned applications are hereby incorporated by reference in their entireties.

TECHNICAL FIELD

This application relates to the field of wireless communications technologies, and in particular, to a method for reporting a measurement result of interference measurement and an apparatus.

BACKGROUND

A high bandwidth is a necessary requirement of new radio (NR) development in a future wireless network, including a 5th generation mobile communications (5G) wireless network. Because a bandwidth of a low frequency band, for example, a frequency band below a 6 gigahertz (GHz) frequency band, is gradually exhausted, a high frequency band will become an available frequency band choice for a future wireless network. In current NR research, a high frequency band (for example, a 20 GHz to 30 GHz frequency band) and the 6G frequency band are important frequency bands for NR bandwidth extension. On the other hand, introducing a relay node (RN) that increases coverage or a throughput is an important method for increasing a network capacity and enhancing coverage extension. Relaying is referred to as integrated access and backhaul (IAB) in NR. A relay node is also referred to as an IAB node. Compared with relaying in long term evolution (LTE), the IAB in the NR is more complexly deployed, and can support multi-hop relaying.

Multi-hop relaying makes a relay system in the NR relatively complex, for example, a more complex interference scenario is brought about. In addition, the relay system in the NR can support different multiplexing modes, for example, time division multiplexing, frequency division multiplexing, and space division multiplexing. Different multiplexing modes refer to multiplexing methods between an access link and a backhaul link. The access link or the backhaul link further includes uplink transmission, downlink transmission, and the like in different multiplexing modes. For another example, space division multiplexing means that a relay node performs communication on the backhaul link and the access link at the same time, or performs receiving on the backhaul link and the access link at the same time. However, it is possible that not all slots or subframes need to support space division multiplexing. Whether to perform space division multiplexing transmission in a same slot or subframe causes different interference modes, and this affects system performance.

SUMMARY

This application provides a method for reporting a measurement result of interference measurement and an apparatus, so that an parent node in an IAB system can learn whether a measurement result reported by a child node is a measurement result obtained by performing interference measurement with space division multiplexing enabled, or a measurement result obtained by performing interference measurement with space division multiplexing disabled, to manage and control interference of the child node.

According to a first aspect, this application provides a method for reporting a measurement result of interference measurement. The method includes: A second node performs interference measurement to obtain one or more measurement results, where the interference measurement includes interference measurement in a first mode and/or interference measurement in a second mode, the interference measurement in the first mode includes that the second node receives a reference signal sent by a first node and a signal sent by a third node, to perform the interference measurement, the interference measurement in the second mode includes that the second node receives the reference signal sent by the first node, to perform the interference measurement, the first node is a parent node of the second node, and the third node is a child node of the second node. The second node sends an uplink signal to the first node, where the uplink signal includes the one or more measurement results, the uplink signal further includes an indication field, and the indication field is used to indicate a mode of the interference measurement corresponding to the one or more measurement results.

In this embodiment of this application, a node is an abbreviation of an IAB node in an IAB system.

In an embodiment, the interference measurement in the first mode refers to interference measurement performed by the second node with space division multiplexing enabled, and the interference measurement in the second mode is interference measurement performed by the second node with space division multiplexing disabled.

In the technical solution of this application, the second node adds the indication field to the uplink signal sent to the first node, to indicate the mode of the interference measurement corresponding to the reported measurement result to the first node, so that when receiving the measurement result of the interference measurement, the first node can learn that the measurement result is obtained by the second node by performing the interference measurement with space division multiplexing enabled, or is obtained by the second node by performing the interference measurement with space division multiplexing disabled. Therefore, the first node can accurately determine an interference level of the second node, to manage and control interference of the second node.

For example, the first node can learn, based on the measurement result reported by the second node, an interference level that is of the second node when space division multiplexing is enabled, to adjust, in time, downlink transmission on a backhaul link of the first node, for example, reduce an order of MCS or adjust a transmit power, to ensure overall performance of receiving, by the second node, a signal with space division multiplexing enabled.

With reference to the first aspect, in some embodiments of the first aspect, the method further includes: The second node obtains a first measurement configuration from the first node, where the first measurement configuration includes an association relationship between one measurement resource and a plurality of report configurations. That the second node performs the interference measurement to obtain the one or more measurement results includes: The second node performs the interference measurement in the first mode on the measurement resource to obtain a first measurement result, and/or the second node performs the interference measurement in the second mode on the measurement resource to obtain a second measurement result. That the second node sends the uplink signal to the first node, includes: The second node sends a first uplink signal to the first node based on a first report configuration in the plurality of report configurations, where the first uplink signal includes the first measurement result and a first indication field, and the first indication field is used to indicate that the first measurement result corresponds to the first mode; and/or the second node sends a second uplink signal to the first node based on a second report configuration in the plurality of report configurations, where the second uplink signal includes the second measurement result and a second indication field, and the second indication field is used to indicate that the second measurement result corresponds to the second mode.

In an embodiment, after obtaining the first measurement configuration, the second node may perform only the interference measurement in the first mode. In this case, the first uplink signal sent by the second node to the first node includes the first measurement result and the first indication field, and the first indication field is used to indicate that the first measurement result corresponds to the first mode. In an embodiment, after obtaining the first measurement configuration, the second node may perform only the interference measurement in the second mode. In this case, the second uplink signal sent by the second node to the first node includes the second measurement result and the second indication field, and the second indication field is used to indicate that the second measurement result corresponds to the second mode. In still another embodiment, after obtaining the first measurement configuration, the second node performs the interference measurement in the first mode and the interference measurement in the second mode.

With reference to the first aspect, in some embodiments of the first aspect, the first report configuration includes first identification information, the first identification information specifies that the first report configuration corresponds to the measurement result of the interference measurement in the first mode, the second report configuration includes second identification information, and the second identification information specifies that the second report configuration corresponds to the measurement result of the interference measurement in the second mode.

In an embodiment, that the first identification information specifies that the first report configuration corresponds to the measurement result of the interference measurement in the first mode may be expressed as that the first identification information is used to specify that a measurement report corresponding to a measurement ID associated with the first report configuration includes the measurement result of the interference measurement in the first mode, and the second identification information specifies that the second report configuration corresponds to the measurement result of the interference measurement in the second mode may be expressed as that the second identification information is used to specify that a measurement report corresponding to a measurement ID associated with the second report configuration includes the measurement result of the interference measurement in the second mode.

When the first node makes a configuration that one measurement resource is associated with a plurality of report configurations, in an embodiment, the first node may specify that the first report configuration is used to report the measurement result of the interference measurement in the first mode, and the second report configuration is used to report the measurement result of the interference measurement in the second mode. The first report configuration and the second report configuration may be any two report configurations in the plurality of report configurations. Specifically, the first node and the second node may reach the following agreement: the first identification information corresponds to the first mode, and the second identification information corresponds to the second mode. If a report configuration delivered by the first node to the second node carries the first identification information, it indicates that the first node specifies that the report configuration is used to report the measurement result of the interference measurement in the first mode. Similarly, if a report configuration delivered by the first node to the second node carries the second identification information, it indicates that the first node specifies that the report configuration is used to report the measurement result of the interference measurement in the second mode. For example, the first identification information may be a bit "1", and the second identification information may be a bit "0".

In an embodiment, the first identification information may further indicate that the first report configuration supports reporting of the measurement result of the interference measurement in the first mode. In this case, a report configuration carrying the first identification information can be used to report both the measurement result of the interference measurement in the first mode and the measurement result of the interference measurement in the second mode.

In other words, when one measurement resource is associated with a plurality of report configurations, in an embodiment, identification information in a report configuration may uniquely specify a mode of interference measurement corresponding to a measurement result that the report configuration is used to report. In this case, the report configuration can be used to report only the measurement result corresponding to the first mode or only the measurement result corresponding to the second mode. In another embodiment, identification information in a report configuration is used to indicate whether the report configuration supports reporting of the measurement result corresponding to the first mode. In other words, in this case, the report configuration supports reporting of the measurement result corresponding to the second mode by default. Therefore, if the identification information indicates that the report configuration supports reporting of the measurement result corresponding to the first mode, the report configuration may be used to report the measurement result corresponding to the first mode, or may be used to report the measurement result corresponding to the second mode. If the identification information indicates that the report configuration does not support reporting of the measurement result corresponding to the first mode, the report configuration can be used to report only the measurement result corresponding to the second mode.

In this embodiment, a meaning specifically indicated in the first identification information may be agreed on by the first node and the second node, or may be stipulated in a protocol. This is not limited in this application.

With reference to the first aspect, in some embodiments of the first aspect, the method further includes: The second node obtains a second measurement configuration from the first node, where the second measurement configuration includes an association relationship between a plurality of measurement resources and one report configuration. That the second node performs the interference measurement to obtain the one or more measurement results includes: The second node performs the interference measurement in the first mode on a first measurement resource in the plurality of measurement resources to obtain a first measurement result, and/or the second node performs the interference measurement in the second mode on a second measurement resource in the plurality of measurement resources to obtain a second measurement result. That the second node sends the uplink signal to the first node, where the uplink signal includes the one or more measurement results, and the uplink signal further includes the indication field, includes: The second node sends a third uplink signal to the first node based on the report configuration, where the third uplink signal includes the first measurement result and a third indication field, and the third indication field is used to indicate that the first measurement result corresponds to the first mode; and/or the second node sends a fourth uplink signal to the first node based on the report configuration, where the fourth uplink signal includes the second measurement result and a fourth indication field, and the fourth indication field is used to indicate that the second measurement result corresponds to the second mode.

When a plurality of measurement resources are associated with one report configuration, the second node may report the measurement result corresponding to the first mode for one measurement resource, and report the measurement result corresponding to the second mode for another measurement resource.

With reference to the first aspect, in some embodiments of the first aspect, the report configuration carries third identification information, and the third identification information is used to indicate whether the report configuration supports reporting of the measurement result of the interference measurement in the first mode.

In this embodiment, the first node may add the third identification information to the report configuration delivered to the second node, and the third identification information is used to indicate whether the report configuration supports reporting of the measurement result of the interference measurement in the first mode. In other words, if the third identification information indicates that the report configuration does not support reporting of the measurement result of the interference measurement in the first mode, the second node can report only the measurement result of the interference measurement in the second mode based on the report configuration. If the third identification information indicates that the report configuration supports reporting of the measurement result of the interference measurement in the first mode, the second node can report both the measurement result of the interference measurement in the first mode and the measurement result of the interference measurement in the second mode based on the report configuration. Therefore, in this case, when reporting the measurement result to the first node, the second node needs to specifically indicate that the measurement result corresponds to the first mode or corresponds to the second mode. For example, the first node and the second node reach the following agreement: if a particular field in the report configuration carries "1", it indicates that the report configuration supports reporting of the measurement result of the interference measurement in the first mode, or if the particular field carries "0", it indicates that the report configuration does not support reporting of the measurement result of the interference measurement in the first mode. When reporting the measurement result to the first node by using the third uplink signal, the second node indicates, to the first node by using the third indication field in the third uplink signal, a mode of interference measurement specifically corresponding to the measurement result. For example, if the third indication field carries "0", it indicates that the measurement result is the measurement result of the interference measurement in the second mode, and if the third indication field carries "1", it indicates that the measurement result is the measurement result of the interference measurement in the first mode.

With reference to the first aspect, in some embodiments of the first aspect, the first measurement resource includes a plurality of time units in time domain, and before the second node performs the interference measurement in the first mode on the first measurement resource, the method further includes: The second node schedules the third node to send the signal in some or all of the plurality of time units.

In an embodiment, the time unit herein may be a subframe, a slot, an OFDM symbol, or the like. This is not limited in this application.

It may be understood that the interference measurement in the first mode is interference measurement performed when the second node performs space division multiplexing. Therefore, after determining the first measurement resource that is used for interference measurement with space division multiplexing enabled, the second node schedules the third node to send the signal in some or all time units that are in the first measurement resource in time domain. Therefore, when the third node sends the signal, the second node receives, at the same time, the reference signal sent by the first node, to perform the interference measurement in the first mode.

With reference to the first aspect, in some embodiments of the first aspect, that the second node obtains the first measurement configuration from the first node includes: The second node sends a measurement configuration request to the first node, where the measurement configuration request is used to request the first node to configure the first measurement configuration, and the measurement configuration request carries a time-frequency resource location that is configured by the second node and at which the third node sends the signal as scheduled. The second node receives the first measurement configuration that is returned by the first node for the measurement configuration request, where the first measurement configuration is determined by the first node based on the time-frequency resource location at which the third node sends the signal.

In an embodiment, the second node may also obtain the second measurement configuration from the first node in the following manner: The second node sends a measurement configuration request to the first node, and the first node generates the second measurement configuration based on the measurement configuration request, and then sends the second measurement configuration to the second node. Only an example in which the second node sends the measurement configuration request to the first node to obtain the first measurement configuration is used herein.

According to a second aspect, this application provides a method for reporting a measurement result of interference measurement. The method includes: A first node receives an uplink signal from a second node, where the uplink signal includes one or more measurement results, the uplink signal further includes an indication field, the indication field is used to indicate a mode of interference measurement corresponding to each of the one or more measurement results, the mode of the interference measurement includes a first mode and/or a second mode, the interference measurement in the first mode includes that the second node receives a reference signal sent by the first node and a signal sent by a third node, to perform the interference measurement, the interference measurement in the second mode includes that the second node receives the reference signal sent by the first node, to perform the interference measurement, the first node is a parent node of the second node, and the third node is a child node of the second node.

The first node determines, based on the indication field, the mode of the interference measurement corresponding to each of the one or more measurement results.

In the technical solution of this application, the second node adds the indication field to the uplink signal sent to the first node, to indicate the mode of the interference measurement corresponding to the reported measurement result to the first node, so that when receiving the measurement result of the interference measurement, the first node can learn that the measurement result is obtained by the second node by performing the interference measurement with space division multiplexing enabled, or is obtained by the second node by performing the interference measurement with space division multiplexing disabled. Therefore, the first node can accurately determine an interference level of the second node, to manage and control interference of the second node.

With reference to the second aspect, in some embodiments of the second aspect, the method further includes: The first node sends a first measurement configuration to the second node, where the first measurement configuration includes an association relationship between one measurement resource and a plurality of report configurations. That the first node receives the uplink signal from the second node, where the uplink signal includes the one or more measurement results, and the uplink signal further includes the indication field, includes: The first node receives a first uplink signal that is sent by the second node based on a first report configuration in the plurality of report configurations, where the first uplink signal includes a first measurement result and a first indication field, and the first indication field is used to indicate that the first measurement result corresponds to the first mode; and/or the first node receives a second uplink signal that is sent by the second node based on a second report configuration in the plurality of report configurations, where the second uplink signal includes a second measurement result and a second indication field, and the second indication field is used to indicate that the second measurement result corresponds to the second mode.

With reference to the second aspect, in some embodiments of the second aspect, the first report configuration includes first identification information, the first identification information specifies that the first report configuration is used to report the measurement result of the interference measurement in the first mode, the second report configuration includes second identification information, and the second identification information specifies that the second report configuration is used to report the measurement result of the interference measurement in the second mode.

With reference to the second aspect, in some embodiments of the second aspect, the method further includes: The first node sends a second measurement configuration to the second node, where the second measurement configuration includes an association relationship between a plurality of measurement resources and one report configuration. That the first node receives the uplink signal from the second node, where the uplink signal includes the one or more measurement results, and the uplink signal further includes the indication field, includes: The first node receives a third uplink signal that is sent by the second node based on the report configuration, where the third uplink signal includes a first measurement result and a third indication field, and the third indication field is used to indicate that the first measurement result corresponds to the first mode; and/or the first node receives a fourth uplink signal that is sent by the second node based on the report configuration, where the fourth uplink signal includes a second measurement result and a fourth indication field, and the fourth indication field is used to indicate that the second measurement result corresponds to the second mode.

With reference to the second aspect, in some embodiments of the second aspect, the report configuration carries third identification information, and the third identification information is used to indicate that the report configuration can be used to report the measurement result of the interference measurement in the first mode or the measurement result of the interference measurement in the second mode.

With reference to the second aspect, in some embodiments of the second aspect, that the first node sends the first measurement configuration to the second node includes: The first node receives a measurement configuration request sent by the second node, where the measurement configuration request is used to request the first node to configure the first measurement configuration, and the measurement configuration request carries a time-frequency resource location that is configured by the second node and at which the third node sends the signal as scheduled. The first node determines the first measurement configuration based on the time-frequency resource location at which the third node sends the signal. The first node sends the first measurement configuration to the second node.

According to a third aspect, this application provides a communications apparatus. The communications apparatus has functions of implementing the second node in any one of the first aspect or some embodiments of the first aspect. The functions may be implemented by hardware, or may be implemented by hardware by executing corresponding software. The hardware or the software includes one or more units corresponding to the foregoing functions.

According to a fourth aspect, this application provides a communications apparatus. The communications apparatus has functions of implementing the first node in any one of the second aspect or some embodiments of the second aspect. The functions may be implemented by hardware, or may be implemented by hardware by executing corresponding software. The hardware or the software includes one or more units corresponding to the foregoing functions.

According to a fifth aspect, this application provides a communications device, including a transceiver, a processor, and a memory. The processor is configured to control the transceiver to send or receive a signal, the memory is configured to store a computer program, and the processor is configured to invoke and run the computer program stored in the memory, so that the communications device performs the method according to any one of the first aspect or some embodiments of the first aspect.

According to a sixth aspect, this application provides a communications device, including a transceiver, a processor, and a memory. The processor is configured to control the transceiver to send or receive a signal, the memory is configured to store a computer program, and the processor is configured to invoke and run the computer program stored in the memory, so that the network device performs the method according to any one of the second aspect or some embodiments of the second aspect.

According to a seventh aspect, this application provides a computer-readable storage medium. The computer-readable storage medium stores an instruction, and when the instruction is run on a computer, the computer is enabled to perform the method according to any one of the first aspect or some embodiments of the first aspect.

According to an eighth aspect, this application provides a computer-readable storage medium. The computer-readable storage medium stores an instruction, and when the instruction is run on a computer, the computer is enabled to perform the method according to any one of the second aspect or some embodiments of the second aspect.

According to a ninth aspect, this application provides a chip, including a processor. The processor is configured to read and execute a computer program stored in a memory, to perform the method in any one of the first aspect or some embodiments of the first aspect. Optionally, the chip further includes a memory, and the memory is connected to the processor.

In an embodiment, the chip further includes a communications interface. The processor is connected to the communications interface. The communications interface is configured to receive data and/or information that needs to be processed. The processor obtains the data and/or information from the communications interface, processes the data and/or information, and outputs a processing result through the communications interface.

According to a tenth aspect, this application provides a chip, including a processor. The processor is configured to read and execute a computer program stored in a memory, to perform the method in any one of the second aspect or some embodiments of the second aspect. Optionally, the chip further includes a memory, and the memory is connected to the processor.

In an embodiment, the chip further includes a communications interface. The processor is connected to the communications interface. The communications interface is configured to receive data and/or information that needs to be processed. The processor obtains the data and/or information from the communications interface, processes the data and/or information, and outputs a processing result through the communications interface.

In an embodiment, the memory and the processor may be physically independent units, or the memory may be integrated into the processor.

According to an eleventh aspect, this application provides a computer program product. The computer program product includes computer program code. When the computer program code is run on a computer, the computer is enabled to perform the method according to any one of the first aspect or some embodiments of the first aspect.

According to a twelfth aspect, this application provides a computer program product. The computer program product includes computer program code. When the computer program code is run on a computer, the computer is enabled to perform the method according to any one of the second aspect or some embodiments of the second aspect.

In the technical solution of this application, the second node adds the indication field to the uplink signal sent to the first node, to indicate the mode of the interference measurement corresponding to the reported measurement result to the first node, so that when receiving the measurement result of the interference measurement, the first node can learn that the measurement result is obtained by the second node by performing the interference measurement with space division multiplexing enabled, or is obtained by the second node by performing the interference measurement with space division multiplexing disabled. Therefore, the first node can learn the interference level of the second node, to manage and control the interference of the second node.

DESCRIPTION OF EMBODIMENTS

The following describes technical solutions of this application with reference to the accompanying drawings.

Names of all nodes and messages in this application are merely names that are set for ease of description in this application, and names in an actual network may be different. It should not be understood that names of various nodes and messages are limited in this application. On the contrary, any name having a function the same as or similar to that of a node or a message used in this application is considered as a method or an equivalent replacement of this application, and shall fall within the protection scope of this application. Details are not described below.

In consideration of a high bandwidth of a future wireless network, it is considered to introduce an integrated access and backhaul (IAB) solution to 5G new radio (NR), to further reduce deployment costs and improve deployment flexibility, and therefore introduce integrated access and backhaul relaying. In this application, a relay node supporting an IAB solution is referred to as an IAB node, to be distinguished from long term evolution (LTE) relaying node. A system including the IAB node is also referred to as a relay system.

Figure 1:
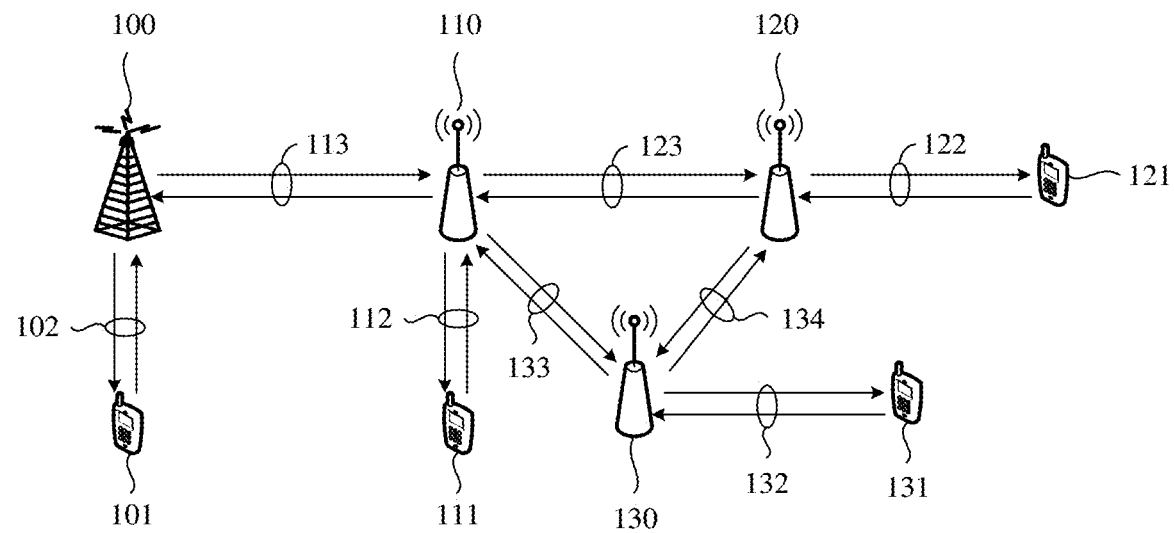
FIG. 1 is a schematic structural diagram of a communications system applicable to the embodiments of this application.

To better understand the method and the apparatus disclosed in the embodiments of this application, a network architecture used in the embodiments of this application is first described. FIG. 1 is a schematic structural diagram of a communications system applicable to the embodiments of this application.

It should be noted that the communications system in some embodiments of this application includes but is not limited to a narrow band-internet of things (NB-IoT) system, a wireless local area network (WLAN) system, an LTE system, a next-generation 5G mobile communications system, or a communications system after 5G, for example, NR or a device to device (D2D) communications system.

FIG. 1 shows an IAB system. One IAB system includes at least: one base station 100, one or more terminal devices (terminal) 101 served by the base station 100, one or more relay nodes (namely, IAB nodes) 110, and one or more terminal devices 111 served by the IAB node 110. Generally, the base station 100 is referred to as a donor base station (DgNB), and the IAB node 110 is connected to the base station 100 by using a wireless backhaul link 113. The donor base station is also referred to as a donor node in this application.

The base station 100 includes but is not limited to an evolved node B (eNB), a radio network controller (RNC), a node B (NB), a base station controller (BSC), a base transceiver station (BTS), a home base station (HNB), a baseband unit (BBU), an evolved LTE base station, and an NR base station (gNB).

The terminal device includes but is not limited to any one of user equipment (UE), a mobile station, an access terminal, a subscriber unit, a subscriber station, a mobile station, a remote station, a remote terminal, a mobile device, a terminal, a wireless communications device, a user agent, a station (ST) in a wireless local area network (WLAN), a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a mobile console in a future 5G network, and a terminal device in a future evolved public land mobile network (PLMN). The IAB node is a particular name of a relay node, and does not limit the solution of this application. The IAB node may be one of the foregoing base stations or terminal devices having a forwarding function, or may be in an independent device form.

The integrated access and backhaul system may further include a plurality of other IAB nodes, for example, an IAB node 120 and an IAB node 130. The IAB node 120 is connected to the IAB node 110 by using a wireless backhaul link 123 to connect to a network. The IAB node 130 is connected to the IAB node 110 by using a wireless backhaul link 133 to connect to a network. The IAB node 120 serves one or more terminal devices 121, and the IAB node 130 serves one or more terminal devices 131. In FIG. 1, both the IAB node 110 and the IAB node 120 are connected to the network by using the wireless backhaul links. In this application, each wireless backhaul link is viewed from a perspective of a relay node. For example, the wireless backhaul link 113 is a backhaul link of the IAB node 110, and the wireless backhaul link 123 is a backhaul link of the IAB node 120. As shown in FIG. 1, one IAB node, for example, 120, may be connected to another IAB node 110 by using a wireless backhaul link, for example, 123, to connect to a network. In addition, the relay node may be connected to the network by using a plurality of wireless relay nodes. It should be understood that using the IAB node in this application is merely for a description requirement, and does not mean that the solutions in this application are used only in an NR scenario. In this application, the IAB node may generally refer to any node or device having a relay function. It should be understood that the IAB node and the relay node in this application have a same meaning.

For ease of description, basic terms or concepts used in this application are first defined.

A parent node is a node that provides a wireless backhaul link resource. For example, the IAB node 110 is referred to as a parent node of the IAB node 120.

A child node is a node that transmits data to or receives data from a network by using a backhaul link resource. For example, the IAB node 120 is referred to as a child node of the IAB node 110. The network herein may be a core network or another network above an access network, for example, the internet or a dedicated network.

An access link is a link between UE and an IAB node or an IAB donor node. Alternatively, the access link includes a wireless link used when a node communicates with a child node of the node. The access link includes an uplink access link and a downlink access link. The uplink access link is alternatively referred to as uplink transmission of the access link, and the downlink access link is alternatively referred to as downlink transmission of the access link.

A backhaul link is a link between an IAB node and an IAB child node or an IAB parent node. The backhaul link includes a downlink transmission link to the IAB child node or the IAB parent node, and an uplink transmission link to the IAB child node or the IAB parent node. Data transmission performed by the IAB node to the IAB parent node or uplink transmission received by the IAB node from the IAB child node is referred to as uplink transmission of the backhaul link. Data transmission received by the IAB node from the IAB parent node or data transmission performed by the IAB node to the IAB child node is referred to as downlink transmission of the backhaul link. To distinguish between UE and the IAB node, a backhaul link between the IAB node and the IAB parent node is also referred to as an upstream backhaul link (parent BH), and a backhaul link between the IAB node and the IAB child node is referred to as a downstream backhaul link (child BH).

Space division multiplexing (SDM) means that a relay node performs downlink transmission to UE or an IAB child node, and uplink transmission to an IAB parent node at the same time, or a relay node receives downlink transmission from an IAB parent node and uplink transmission from UE or an IAB child node at the same time.

Generally, a child node may be considered as a terminal device of a parent node. It should be understood that in the integrated access and backhaul system in FIG. 1, one IAB node is connected to one parent node. However, in a future relay system, to improve reliability of a wireless backhaul link, for an IAB node, for example, 120, a plurality of parent nodes may provide a service for the IAB node at the same time. For example, the IAB node 130 in FIG. 1 may be further connected to the IAB node 120 by using a backhaul link 134. In other words, both the IAB node 110 and the IAB node 120 are considered as parent nodes of the IAB node 130. Names of the IAB nodes 110, 120, and 130 do not limit a deployment scenario or network thereof, and may be any other name such as a relay or an RN. Using the IAB node in this application is merely for ease of description.

In FIG. 1, each of the wireless links 102, 112, 122, 132, 113, 123, 133, and 134 may be a bidirectional link, and includes uplink and downlink transmission links. Particularly, the wireless backhaul links 113, 123, 133, and 134 may be used by a parent node to provide a service for a child node. For example, a parent node 100 provides a wireless backhaul service for a child node 110. It should be understood that an uplink and a downlink of a backhaul link may be separated. In other words, transmission on the uplink and transmission on the downlink are performed by using different nodes. The downlink transmission means that a parent node, for example, the node 100, transmits information or data to a child node, for example, the node 110, and the uplink transmission means that a child node, for example, the node 110, transmits information or data to a parent node, for example, the node 100. The node is not limited to a network node or a terminal device. For example, in a D2D scenario, a terminal device may serve as a relay node to serve another terminal device. The wireless backhaul link may be alternatively an access link in some scenarios. For example, the backhaul link 123 may be alternatively considered as an access link for the node 110, and the backhaul link 113 may be alternatively an access link for the node 100.

It should be understood that the parent node may be a base station or a relay node, and the child node may be a relay node or a terminal device having a relay function. For example, in the D2D scenario, the child node may be a terminal device.

The relay node, for example, 110, 120, and 130, in FIG. 1, may exist in two forms: One is an independent access node, and may independently manage a terminal device connected to the relay node. In this case, the relay node usually has an independent physical cell identifier (PCI). The relay node in this form usually needs to have a complete protocol stack function, for example, a radio resource control (RRC) function. Such relay node is usually referred to as a layer 3 relay node. A relay node in the other form and a donor node, for example, a donor eNB or a donor gNB, belong to a same cell, and user management is performed by a donor base station, for example, a donor node. Such relaying is usually referred to as layer 2 relaying. In an NR control-bearer split (CU-DU) architecture, a layer 2 relay usually exists as a DU of a base station DgNB, and communicates with a CU by using an F1 application protocol (F1-AP) interface or a tunneling protocol. The tunneling protocol may be, for example, a general packet radio service tunneling protocol (GTP). Details are not described. The Donor node is a node that can be used to connect to a core network, or an anchor base station of a radio access network, and a connection to a network can be implemented by using the anchor base station. The anchor base station is responsible for receiving data from a core network and forwarding the data to a relay node, or receiving data from a relay node and forwarding the data to a core network. Generally, a donor node in a relay system is referred to as an IAB donor, namely, a donor node. In this application, two terms may be used exchangeably. It should be understood that the IAB donor and the donor node should not be understood as entities or network elements having different functions.

The following describes the technical solutions of this application.

In the embodiments of this application, numbers "first", "second", "third", and the like are merely numbers used to distinguish between different described objects, for example, to distinguish between different IAB nodes, different measurement configurations, or different indication fields, and do not have substantive meanings. Therefore, no limitation should be imposed on the technical solutions of this application.

With introduction of a multiple input multiple output (MIMO) technology in new radio (NR), energy of a signal during transmission in the air may be concentrated in a particular direction, so that the signal is isolated in space to a particular degree. This makes it possible for a communications device to send or receive signals at the same time. Therefore, it can be applied to half-duplex transmission of the IAB system.

However, based on an architecture design of the IAB system, uplink signal sending or downlink signal receiving of an IAB node is scheduled and determined by an upstream IAB node directly connected to the IAB node. Therefore, if an IAB (marked as an IAB node 1) configures its downstream IAB node (marked as an IAB node 2) to perform interference measurement, when performing the interference measurement, the downstream IAB node may schedule a downstream IAB node (marked as an IAB node 3), directly connected to the IAB node, to send a signal. When receiving a reference signal sent by the IAB node 1, to perform interference measurement, if the IAB node 2 receives, at the same time, an uplink signal sent by the IAB node 3, it is highly possible that a measurement result of the interference measurement is affected. In this way, after completing the interference measurement, the IAB node 2 reports the measurement result to the IAB node 1 (or a donor base station). The IAB node 1 does not learn that the measurement result is obtained by the IAB node 2 by performing the interference measurement when the IAB node 2 enables space division multiplexing for receiving, and as a result, may incorrectly determine an interference level of the IAB node 2. Because the IAB node 3 sends the signal as scheduled and determined by the IAB node 2, the IAB node 1 cannot learn when the IAB node 2 may enable space division multiplexing for receiving.

Figure 2:
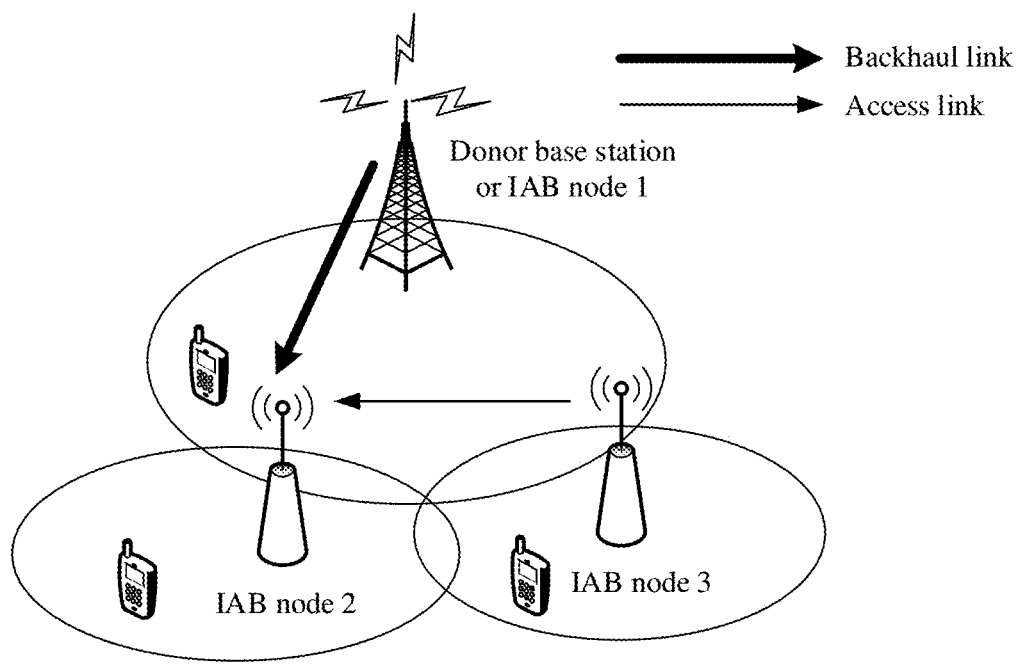
FIG. 2 is an example of a scenario applicable to the embodiments of this application.

FIG. 2 is an example of a scenario applicable to the embodiments of this application. As shown in FIG. 2, based on an existing technical solution, the IAB node 3 sends the uplink signal to the IAB node 2 as scheduled and determined by the parent node, namely, the IAB node 2, of the IAB node 3, the IAB node 2 receives, as scheduled by the IAB node 1, a downlink signal sent by the IAB node 1, and the IAB node 1 may be a donor. Therefore, when configuring the IAB node 2 to perform the interference measurement, the IAB node 1 cannot learn when the IAB node 2 may enable space division multiplexing for receiving, and as a result, cannot manage interference caused because the IAB node 2 enables space division multiplexing for receiving.

It can be learned that in the IAB system, an upstream IAB node (for example, the IAB node 1) cannot manage or control interference of a downstream IAB node (for example, the IAB node 2), and as a result, signal transmission performance of the entire system may be affected.

Therefore, in the technical solutions of this application, a method for reporting a measurement result of interference measurement is proposed, so that when receiving a measurement result of interference measurement from a downstream IAB node, an upstream IAB node can learn whether the measurement result is obtained by the downstream IAB node by performing the interference measurement with space division multiplexing enabled, or is obtained by the downstream IAB node by performing the interference measurement with space division multiplexing disabled. Therefore, the upstream IAB node can manage and control interference of the downstream IAB node.

First, it should be noted that in this embodiment of this application, all of a first node, a second node, and a third node may be IAB nodes. The second node is a child node of the first node, and the third node is a child node of the second node. In an embodiment, the first node may be alternatively a donor base station (namely, a donor). When the first node is an IAB node, a parent node of the first node may be a donor base station or another IAB node. In an embodiment, the third node may be alternatively a terminal device.

For example, the first node may be a donor base station (donor) or the IAB node 1 in FIG. 2, the second node may be the IAB node 2 in FIG. 2, and the third node may be the IAB node 3 in FIG. 2.

It is well known to a person skilled in the art that a reporting mechanism of interference measurement includes a reporting mechanism of L1 measurement and a reporting mechanism of L3 measurement. The L1 measurement is real-time and dynamic, and is mainly used for channel estimation and transmission parameter (for example, a MIMO order or a modulation order) adjustment. The L3 measurement is relatively slow, and is usually used for a related operation of mobility management. A method 200 for reporting a measurement result of interference measurement in this application is applicable to both the reporting mechanism of the L1 and the reporting mechanism of the L3.

Manner 1

A child node sends an uplink signal to a parent node (or a donor base station). The uplink signal carries one or more measurement results of interference measurement, and the uplink signal further includes an indication field. The indication field is used to indicate a mode of the interference measurement corresponding to each of the one or more measurement results in the uplink signal.

A mode of interference measurement will be described in detail below.

Figure 3:
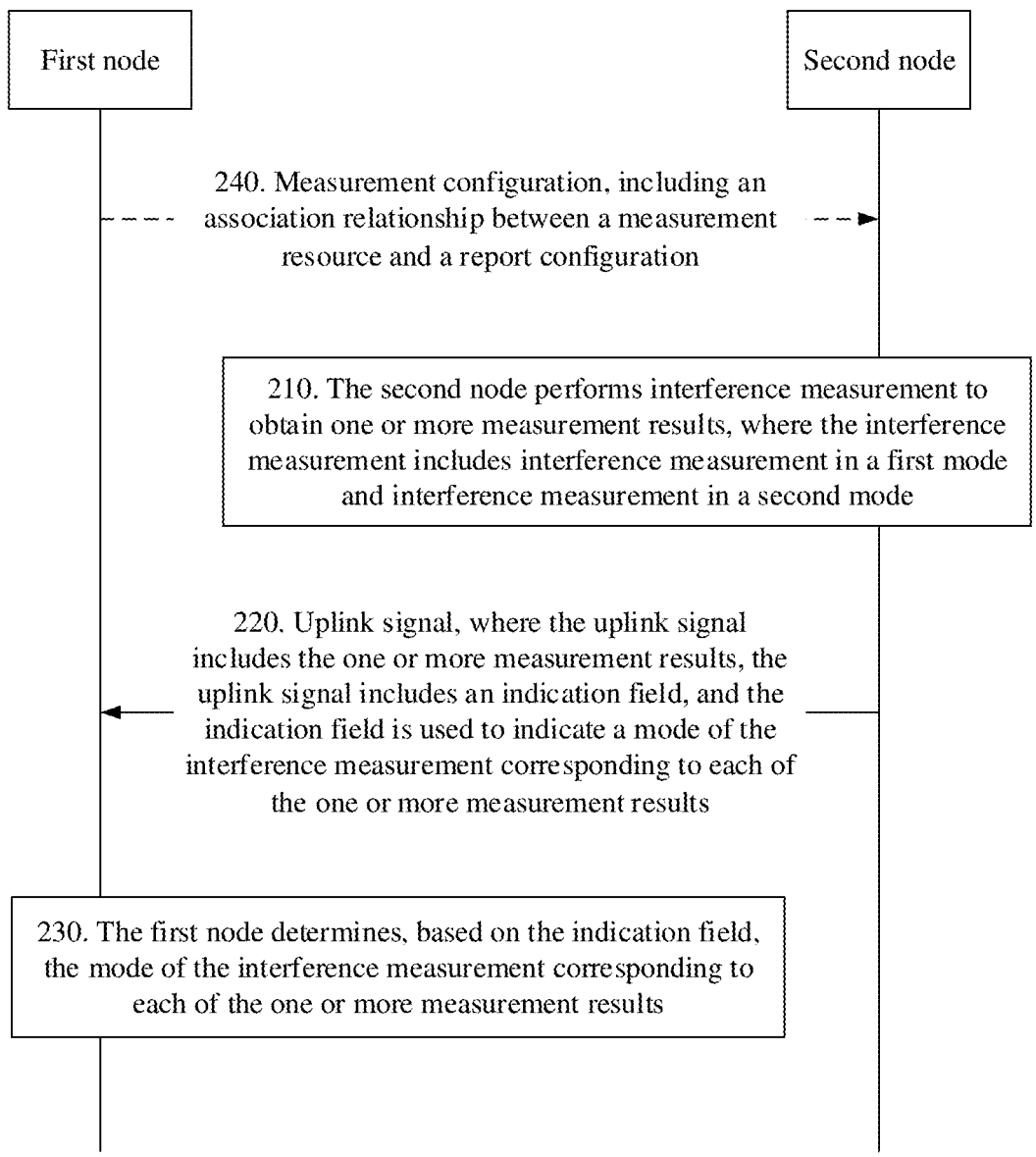
FIG. 3 is a schematic flowchart of a method 200 for reporting a measurement result of interference measurement according to this application.

FIG. 3 is a schematic flowchart of the method 200 for reporting a measurement result of interference measurement according to this application.

210. A second node performs interference measurement to obtain one or more measurement results.

In step 210, the interference measurement of the second node includes interference measurement in a first mode and/or interference measurement in a second mode. The interference measurement in the first mode includes that the second node receives a reference signal sent by a first node and a signal sent by a third node, to perform the interference measurement. The interference measurement in the second mode includes that the second node receives the reference signal sent by the first node, to perform the interference measurement.

For example, in FIG. 2, the interference measurement in the first mode may be that the IAB node 2 receives a downlink reference signal sent by a parent node of the IAB node 2 and an uplink signal sent by the IAB node 3, to perform the interference measurement, and the interference measurement in the second mode may be that the IAB node 2 receives the downlink reference signal sent by the parent node of the IAB node 2, to perform the interference measurement.

In an embodiment, herein, the parent node of the IAB node 2 may be a donor or another IAB node. In FIG. 2, when the parent node of the IAB node 2 is another IAB node, the IAB node is marked as the IAB node 1.

In other words, in the first mode, the second node receives the reference signal from the first node and the signal from the third node at the same time, to perform the interference measurement, and in the second mode, the second node receives the reference signal from the first node, to perform the interference measurement. Alternatively, the interference measurement in the first mode may be referred to as interference measurement performed by the second node with space division multiplexing enabled, and the second mode may be referred to as interference measurement performed by the second node with space division multiplexing disabled.

It should be noted that the reference signal received by the second node from the first node is used for interference measurement, and the reference signal includes but is not limited to a channel state information reference signal (CSI-RS), a phase tracking reference signal (PT-RS), a demodulation reference signal (DM-RS), and a synchronization signal (SS). The synchronization signal includes a primary synchronization signal (PSS) and a secondary synchronization signal (SSS). The signal received by the second node from the third node may be a reference signal, or may be a common signal that includes data and/or information. The signal received by the second node from the third node may be a reference signal, and the reference signal includes but is not limited to a DM-RS, a sounding reference signal (SRS), and a PT-RS. To be specific, in the interference measurement in the first mode, when receiving the reference signal sent by the first node, the second node schedules the third node to send data and/or information, or may schedule the third node to send a reference signal. This is not limited herein. It should be understood that when the third node is scheduled to send the data and/or the information, a DM-RS may be added to the data and/or the information.

In step 210, the second node performs the interference measurement may include a plurality of possible manners. For example, if the second node does not enable space division multiplexing, the second node performs only the interference measurement in the second mode, to obtain a corresponding measurement result. Alternatively, if the second node enables space division multiplexing, the second node may perform only the interference measurement in the first mode, to obtain a corresponding measurement result. Alternatively, the second node may perform both the interference measurement in the first mode and the interference measurement in the second mode, and in this case, the second node may obtain a measurement result corresponding to the interference measurement in the first mode and a measurement result corresponding to the interference measurement in the second mode.

In this embodiment of this application, the measurement result may include one or more of a channel quality indicator (CQI), a reference signal received power (RSRP), a precoding matrix indicator (PMI), a rank indication (RI), and a CSI-reference signal resource indicator (CRI), or may be another parameter that can represent an interference level.

220. The second node sends an uplink signal to the first node, and the first node receives the uplink signal from the second node.

The uplink signal includes the one or more measurement results, the uplink signal further includes an indication field, and the indication field is used to indicate a mode of the interference measurement corresponding to each of the one or more measurement results.

In an embodiment, the uplink signal in step 220 may be a physical uplink control channel (PUCCH), a physical uplink shared channel (PUSCH), a media access control control element (MAC CE), or the like.

If the second node performs only the interference measurement in the first mode in step 210, in step 220, the uplink signal includes the measurement result of the interference measurement in the first mode. In this case, the indication field in the uplink signal is used to indicate that the measurement result corresponds to the first mode. If the second node performs only the interference measurement in the second mode, in step 220, the uplink signal includes the measurement result of the interference measurement in the second mode. In this case, the indication field in the uplink signal is used to indicate that the measurement result corresponds to the second mode. If the second node performs both the interference measurement in the first mode and the interference measurement in the second mode, in step 220, the uplink signal may include two measurement results. In this case, the indication field in the uplink signal is used to indicate that one measurement result corresponds to the first mode, and the other measurement result corresponds to the second mode. It should be understood that if the second node performs both the interference measurement in the first mode and the interference measurement in the second mode, the second node may alternatively send an uplink signal for each of the first mode and the second mode, and this is similar to a case of performing only the interference measurement in the first mode and a case of performing only the interference measurement in the second mode. Details are not described again.

In an embodiment, there may be one or more measurement results of the interference measurement in the first mode, and there may also be one or more measurement results of the interference measurement in the second mode. In this case, the indication field in the uplink signal needs to indicate a mode of interference measurement corresponding to each of the plurality of measurement results. It should be understood that there may be one or more measurement results includes that measurement is performed for different signals during measurement in the first mode. Therefore, the measurement result further needs to include information about a measurement object, and the measurement object may be a measured signal, for example, the foregoing reference signal. Certainly, measurement result of different signals may also be sent separately, a method is described above, and details are not described again.

For example, 0 indicates the interference measurement performed with space division multiplexing disabled, and 1 indicates the interference measurement performed with space division multiplexing enabled. Therefore, 0 corresponds to the second mode, and 1 corresponds to the first mode.

230. The first node determines, based on the indication field, the mode of the interference measurement corresponding to each of the one or more measurement results.

In an embodiment, the uplink signal may include one measurement result. In this case, the indication field may include one bit, and the bit is used to indicate a mode of the interference measurement corresponding to the measurement result. In an embodiment, the uplink signal may include a plurality of measurement results. In this case, the indication field may include a plurality of bits, and the plurality of bits are used to indicate modes of the interference measurement corresponding to the plurality of measurement results.

For example, the uplink signal includes one measurement result, and the indication field may be set to "0", to indicate that the measurement result in the uplink signal is obtained by the second node by performing the interference measurement in the second mode. For another example, the uplink signal includes one measurement result, and the indication field is a bit "1", to indicate that the measurement result in the uplink signal is obtained by the second node by performing the interference measurement in the first mode. For another example, the uplink signal includes two measurement results, and the indication field is "01", to indicate that the first measurement result is obtained by the second node by performing the interference measurement in the second mode, and the second measurement result is obtained by the second node by performing the interference measurement in the first mode. The first measurement result or the second measurement result herein may be distinguished from each other in terms of time.

In the technical solution of the method 200, the second node adds the indication field to the uplink signal sent to the first node, to indicate the mode of the interference measurement corresponding to the reported measurement result to the first node, so that when receiving the measurement result of the interference measurement, the first node can learn that the measurement result is obtained by the second node by performing the interference measurement with space division multiplexing enabled, or is obtained by the second node by performing the interference measurement with space division multiplexing disabled. Therefore, the first node can manage and control interference of the second node.

For example, generally, when the second node enables space division multiplexing for receiving, a CQI obtained through interference measurement is small, and when the second node does not enable space division multiplexing for receiving, a CQI is large. For example, the CQI reported by the second node is relatively small, and the indication field indicates that the measurement result corresponds to the first mode. When determining, based on a value of the CQI fed back by the second node, that the second node enables space division multiplexing for receiving, the first node can adjust downlink transmission on a backhaul link of the first node in time, for example, reduce a order of modulation and coding scheme (MCS) of a signal sent to the second node or adjust a transmit power, to improve overall performance when the second node enables space division multiplexing for receiving.

In an embodiment, before the second node performs the interference measurement, the method 200 further includes step 240.

240. The second node obtains a measurement configuration from the first node, where the measurement configuration includes an association relationship between a measurement resource and a report configuration.

It should be understood that the measurement configuration (measConfig) includes a measurement ID, a measurement object ID (measObjectID), and a report configuration ID (reportConfigID). Each measurement ID corresponds to one measurement object having a report configuration. A plurality of measurement identifiers are configured, so that a plurality of measurement objects can be enabled to correspond to a same report configuration, or a plurality of report configurations can be enabled to correspond to a same measurement object.

A measurement configuration may include an association relationship between one or more measurement objects and a report configuration. Each measurement object ID is used to identify one measurement object. The measurement object includes an object, for example, a measurement resource, on which a communications device (for example, an IAB node or UE) performs measurement. Each report configuration identifier is used to identify one report configuration. The report configuration may include a reporting criterion (reporting criterion), an RS type, a report format, a trigger type (for example, a period type or an event type) of a measurement report, a reporting period of a measurement result, a unit used to report a measurement result, and the like. For example, a measurement result may be a signal to interference plus noise ratio (SINR), or the like.

In an embodiment, the measurement resource in this embodiment of this application may be one or more of an interference measurement resource, a synchronization signal block (SSB), and a reference signal (RS).

In an embodiment, when the measurement resource is an interference measurement resource, the interference measurement resource may be a channel state information (CSI) resource, for example, a CSI-RS. Further, the CSI resource may further include a channel state information-interference management (CSI-IM) resource and a channel state information-reference signal (CSI-RS) resource. Further, the CSI-RS resource includes a non zero power CSI-RS (NZP CSI-RS) resource and/or a zero power CSI-RS (ZP CSI-RS) resource.

In an embodiment, in this embodiment of this application, the first node may make a configuration that one measurement resource is associated with a plurality of report configurations or that a plurality of measurement resources are associated with one report configuration.

Therefore, step 240 of obtaining, by the second node, the measurement configuration from the first node includes:

The second node obtains a first measurement configuration from the first node, where the first measurement configuration includes an association relationship between one measurement resource and a plurality of report configurations.

1. One measurement resource is associated with a plurality of report configurations.

It may be understood that this application includes the following two cases: the second node performs interference measurement with space division multiplexing enabled and the second node performs interference measurement with space division multiplexing disabled. Therefore, an example in which one measurement resource is associated with two report configurations is used for description below.

The first node makes a configuration that one measurement resource is associated with two report configurations. Specifically, the first node may make a configuration that an identifier of the measurement resource is associated with report configuration identifiers (ReportConfigID) of the two report configurations.

In an embodiment, the first node may send radio resource control (RRC) signaling to the second node, and add, to measConfig in the RRC signaling, the association relationship between the measurement resource identifier, namely, the measurement resource ID, and the report configuration identifiers.

The second node receives the RRC signaling from the first node, obtains the association relationship between the report configurations and the measurement resource from the measConfig in the RRC signaling, and triggers interference measurement.

The second node performs only the interference measurement in the first mode on the measurement resource configured in the measurement configuration, to obtain the first measurement result. Alternatively, the second node performs only the interference measurement in the second mode on the measurement resource, to obtain the second measurement result. Alternatively, the second node performs the interference measurement in the first mode and the interference measurement in the second mode on the measurement resource, to respectively obtain the first measurement result and the second measurement result.

Further, reporting, by the second node, the measurement result of the interference measurement to the first node may be triggered based on downlink control information (DCI) sent by a parent node. The parent node may trigger two measurement reports for the same measurement resource.

If the second node performs only the interference measurement in the first mode, the second node sends a first uplink signal to the first node, where the first uplink signal includes the first measurement result and a first indication field, and the first indication field is used to indicate that the first measurement result corresponds to the first mode. If the second node performs only the interference measurement in the second mode, the second node sends a second uplink signal to the first node, where the second uplink signal includes the second measurement result and a second indication field, and the second indication field is used to indicate that the second measurement result corresponds to the second mode. Alternatively, the second node performs the interference measurement in the first mode and the interference measurement in the second mode, and the second node may send the first measurement result and the second measurement result to the first node by using one uplink signal, and indicate a mode of the interference measurement corresponding to each measurement result. Alternatively, the second node sends each of the first measurement result and the second measurement result by using one uplink signal. This is not limited in this application.

It should be noted that in a two-layer architecture of an IAB system, for an IAB node, RRC signaling is generated (or encapsulated) by a donor base station (donor), and then is transmitted to the IAB node over an air interface by using one or more hops. A MAC message or DCI is generated by an upstream IAB node directly connected to the IAB node and sent to the IAB node. In a three-layer architecture of an IAB system, for an IAB node, all of RRC signaling, a MAC message, and DCI are generated by an upstream IAB node directly connected to the IAB node. This is applicable to all embodiments of this application, and no separate description is provided.

In an embodiment, when one measurement resource is associated with two report configurations, the first node specifies, in the first measurement configuration sent to the second node, that one of the two report configurations corresponds to the interference measurement in the first mode and the other report configuration corresponds to the interference measurement in the second mode. Specifically, the first node may add different identification information to the report configurations for specifying. For example, if a report configuration carries first identification information, it indicates that the report configuration corresponds to the measurement result of the interference measurement in the first mode. If a report configuration carries second identification information, it indicates that the report configuration corresponds to the measurement result of the interference measurement in the second mode. In other words, identification information in a report configuration may uniquely specify a mode of interference measurement corresponding to a measurement result that the report configuration is used to report. In this case, the report configuration can be used to report only the measurement result corresponding to the first mode or only the measurement result corresponding to the second mode.

In the following, the report configuration corresponding to the first mode is marked as a first report configuration, and the report configuration corresponding to the second mode is marked as a second report configuration.

If the first report configuration sent by the first node to the second node carries the first identification information, it indicates that the first node specifies that the first report configuration corresponds to the measurement result of the interference measurement in the first mode. In an embodiment, the second report configuration may carry the second identification information, to indicate that the first node specifies that the second report configuration corresponds to the measurement result of the interference measurement in the second mode in this case. When the first report configuration carries the second identification information, it indicates that the first node specifies that the first report configuration corresponds to the measurement result of the interference measurement in the second mode. In an embodiment, the second report configuration may carry the first identification information, to indicate that the first node specifies that the second report configuration corresponds to the measurement result of the interference measurement in the first mode in this case.

In an embodiment, identification information in a report configuration is used to indicate whether the report configuration supports reporting of the measurement result corresponding to the first mode. In other words, in this case, the report configuration supports reporting of the measurement result corresponding to the second mode by default. For example, if the first identification information indicates that the report configuration supports reporting of the measurement result of the first mode, the report configuration may correspond to the measurement result of the first mode or the measurement result of the second mode. If the first identification information indicates that the report configuration does not support reporting of the measurement result of the first mode, the report configuration can correspond only to the measurement result of the second mode.

In this embodiment, a meaning specifically indicated in the first identification information may be agreed on by the first node and the second node, or may be stipulated in a protocol. This is not limited in this application.

The following describes, by using an example in which the first node specifies that the first report configuration corresponds to the measurement result of the first mode and the second report configuration corresponds to the measurement result of the second mode, how the second node reports the measurement result of the interference measurement.

If the second node enables space division multiplexing, the second node performs the interference measurement in the first mode on the measurement resource associated with the first report configuration, to obtain the first measurement result. Then, the second node sends an uplink signal to the first node, where the uplink signal includes the first measurement result. The second node performs the interference measurement in the second mode on the measurement resource associated with the second report configuration, to obtain the second measurement result. Then, the second node sends an uplink signal to the first node, where the uplink signal includes the second measurement result.

It may be understood that because the first node has specified a mode of interference measurement corresponding to each report configuration, when the second node sends an uplink signal including a measurement result to the first node, the uplink signal may not carry an indication field.

That the second node sends an uplink signal for each of the first measurement result and the second measurement result is merely used as an example herein. Actually, reporting, by the second node, the measurement result of the interference measurement to the first node depends on scheduling of the first node. For example, the first node may schedule the second node to report the first measurement result and the second measurement result by using one uplink signal.

If the second node does not enable space division multiplexing, the second node reports 0 in a measurement report corresponding to the first report configuration, and reports an actual measurement result in a measurement report corresponding to the second report configuration.

That one measurement resource is associated with two report configurations is described below by way of example and with reference to FIG. 4 and FIG. 5.

Figure 4:
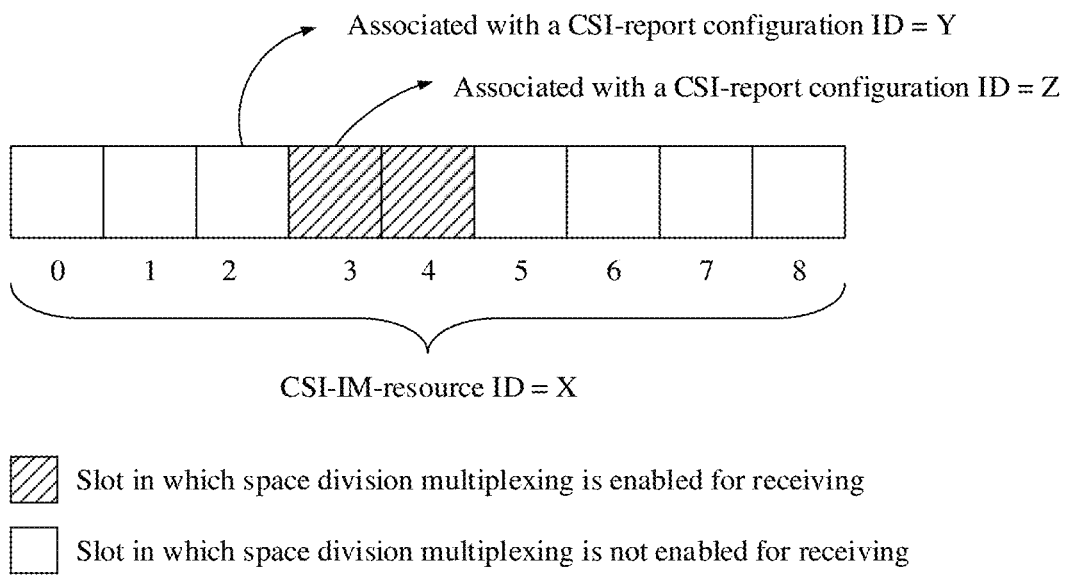
FIG. 4 is a schematic diagram showing that one measurement resource is associated with two report configurations.

FIG. 4 is a schematic diagram showing that one measurement resource is associated with two report configurations. A measurement resource identifier in FIG. 4 is marked as a CSI-IM-ResourceID, and it is assumed that CSI-IM-ResourceID=X. A CSI-IM-Resource includes eight slots in time domain (merely used as an example). The first node makes a configuration that a slot 3 and a slot 4 are associated with CSI-ReportConfigID=Z and the remaining slots are associated with CSI-ReportConfigID=Y. The second node performs, based on the association relationships, the interference measurement in the first mode in the slot 3 and the slot 4 and the interference measurement in the second mode in the other slots. For reporting, by the second node, the measurement result to the first node, refer to FIG. 5.

Figure 5:
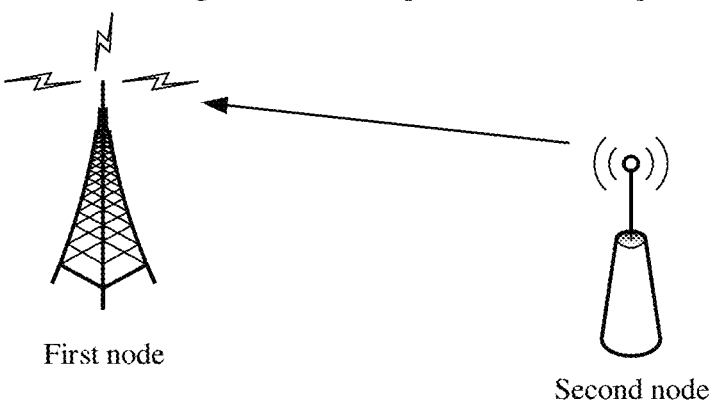
FIG. 5 is a schematic diagram of reporting, by a second node, a measurement result of interference measurement to a first node.

FIG. 5 is a schematic diagram of reporting, by the second node, the measurement result of the interference measurement to the first node. The second node reports, in a measurement report corresponding to the CSI-ReportConfigID=Y, the measurement result of the interference measurement in the second mode, and reports, in a measurement report corresponding to the CSI-ReportConfigID=Z, the measurement result of the interference measurement in the first mode.

In an embodiment, the first node triggers two measurement reports for one measurement resource, but does not specify modes of the interference measurement of the measurement results that the two measurement reports are respectively used to report, and the second node determines the corresponding modes on its own.

If the second node enables space division multiplexing, after completing the interference measurement in the first mode and the interference measurement in the second mode, to respectively obtain the first measurement result and the second measurement result, the second node selects a measurement report corresponding to a measurement ID associated with one of the report configurations, to report the first measurement result, and reports the second measurement result in a measurement report corresponding to a measurement ID associated with the other report configuration. If the second node does not enable space division multiplexing, after completing the interference measurement in the second mode to obtain the second measurement result, the second node selects a measurement report corresponding to a measurement ID associated with one of the report configurations, to report the second measurement result, and reports 0 in a measurement report corresponding to a measurement ID associated with the other report configuration. Herein, reporting 0 in the measurement report corresponding to the measurement ID associated with the report configuration implicitly indicates that the second node does not enable the interference measurement in the first mode, namely, does not enable space division multiplexing. In an embodiment, when the second node does not enable space division multiplexing, the second node may alternatively report the measurement result of the second mode in measurement reports corresponding to measurement IDs associated with the two report configurations. This is not limited in this application.

In an embodiment, step 240 of obtaining, by the second node, the measurement configuration from the first node includes:

The second node obtains a second measurement configuration from the first node, where the second measurement configuration includes an association relationship between a plurality of measurement resources and one report configuration.

In this application, the first measurement configuration and the second measurement configuration are not limited to being obtained by using one piece of signaling or a plurality of pieces of signaling.

2. A plurality of measurement resources are associated with one report configuration.

In this embodiment of this application, the first node may alternatively make a configuration that a plurality of measurement resources are associated with one report configuration. Similarly, description is provided below by using an example in which two measurement resources are associated with one report configuration.

In an embodiment, two measurement resources associated with one report configuration may correspond to different time-frequency resource locations.

In an embodiment, two measurement resources associated with one report configuration may correspond to a same time-frequency resource location, and only have different IDs. This is not limited in this application.

For ease of description, the two measurement resources are respectively marked as a first measurement resource and a second measurement resource below.

Similarly, the first node makes a configuration, for the second node by using RRC signaling, that one report configuration is associated with the first measurement resource and the second measurement resource. Specifically, the first node may make a configuration that a report configuration identifier (ReportConfigID) is associated with a first measurement resource identifier and a second measurement resource identifier.

The second node receives the RRC signaling from the first node, and obtains the association relationship between the report configuration and both the first measurement resource and the second measurement resource from the RRC signaling.

In an embodiment, the first node may specify that the first measurement resource is used for the interference measurement in the first mode, and the second measurement resource is used for the interference measurement in the second mode.

If the second node enables space division multiplexing, the second node performs the interference measurement in the first mode on the first measurement resource, to obtain the first measurement result. The second node sends a third uplink signal to the first node based on the report configuration, where the third uplink signal includes the first measurement result and a third indication field, and the third indication field is used to indicate that the first measurement result in the third uplink signal corresponds to the interference measurement in the first mode. The second node performs the interference measurement in the second mode on the second measurement resource, to obtain the second measurement result. The second node sends a fourth uplink signal to the first node based on the report configuration, where the fourth uplink signal includes the second measurement result and a fourth indication field, and the fourth indication field is used to indicate that the second measurement result in the fourth uplink signal corresponds to the interference measurement in the second mode.

In an embodiment, when a plurality of measurement resources are associated with one report configuration, the report configuration carries third identification information, and the third identification information is used to indicate whether the report configuration supports reporting of the measurement result of the interference measurement in the first mode.

In other words, if the third identification information indicates that the report configuration does not support reporting of the measurement result of the interference measurement in the first mode, the second node can report only the measurement result of the interference measurement in the second mode based on the report configuration. If the third identification information indicates that the report configuration supports reporting of the measurement result of the interference measurement in the first mode, the second node can report both the measurement result of the interference measurement in the first mode and the measurement result of the interference measurement in the second mode based on the report configuration. Therefore, in this case, when reporting the measurement result to the first node, the second node needs to specifically indicate that the measurement result corresponds to the first mode or corresponds to the second mode. For example, the first node and the second node reach the following agreement: if a particular field in the report configuration carries "1", it indicates that the report configuration supports reporting of the measurement result of the interference measurement in the first mode, or if the particular field carries "0", it indicates that the report configuration does not support reporting of the measurement result of the interference measurement in the first mode. When reporting the measurement result to the first node by using the third uplink signal, the second node indicates, to the first node by using the third indication field in the third uplink signal, a mode of interference measurement specifically corresponding to the measurement result. For example, if the third indication field carries "0", it indicates that the measurement result is the measurement result of the interference measurement in the second mode, and if the third indication field carries "1", it indicates that the measurement result is the measurement result of the interference measurement in the first mode.

In an embodiment, when the second node does not enable space division multiplexing, the second node reports 0 in a measurement report corresponding to the report configuration associated with the first measurement resource, and reports an actual measurement result (namely, the second measurement result) in the measurement report corresponding to the report configuration associated with the second measurement resource.

In an embodiment, when configuring the association relationship between the report configuration and both the first measurement resource and the second measurement resource, the first node does not specify modes of interference measurement for which the first measurement resource and the second measurement resource are respectively used, and the second node determines the modes on its own.

For example, the second node determines, from a plurality of (for example, two) measurement resources configured by the first node, that the first measurement resource is used for the interference measurement in the first mode. After completing the interference measurement in the first mode on the first measurement resource, to obtain the first measurement result, the second node sends a uplink signal to the first node, where the uplink signal includes the first measurement result, and an indication field in the uplink signal may be set to 1, to indicate that the first measurement result in the uplink signal corresponds to the interference measurement in the first mode. The second node determines that the second measurement resource in the plurality of measurement resources is used for the interference measurement in the second mode. After completing the interference measurement in the second mode on the second measurement resource, to obtain the second measurement result, the second node sends an uplink signal to the first node, where the uplink signal includes the second measurement result, and an indication field in the uplink signal may be set to 0, to indicate that the second measurement result in the uplink signal corresponds to the interference measurement in the second mode.

Similarly, that the second node sends each of the first measurement result and the second measurement result by using one uplink signal is merely used as an example herein. The first node may alternatively schedule the second node to report both the first measurement result and the second measurement result by using one uplink signal. In this case, for example, an indication field in the uplink signal may be set to "10", to indicate that the first measurement result corresponds to the first mode and the second measurement result corresponds to the second mode. This is not limited in this embodiment of this application.

It may be understood that one measurement resource may include a plurality of time units in time domain. The time unit herein may be a subframe, a slot, an OFDM symbol, or the like.

Therefore, after obtaining the measurement configuration from the first node, the second node determines the first measurement resource used for the interference measurement in the first mode. For example, when one report configuration is associated with a plurality of measurement resources, the first node may specify a measurement resource used for the interference measurement in the first mode. Alternatively, the first node does not specify a measurement resource, and the second node selects, on its own, a measurement resource from the plurality of measurement resources to perform the interference measurement in the first mode. After determining the first measurement resource, the second node schedules the third node to send the signal in some or all time units in the plurality of time units included in the first measurement resource.

In this way, the second node obtains two measurement results. One measurement result is the measurement result (namely, the first measurement result in this specification) of performing the interference measurement in the first mode. The other measurement result is the measurement result (namely, the second measurement result in this specification) of the interference measurement in the second mode.

In an embodiment, the second node may obtain the first measurement configuration or the second measurement configuration from the first node by using different embodiments. Description is provided below by using an example in which the second node obtains the first measurement configuration from the first node.

In an embodiment, the first node may directly send the first measurement configuration to the second node. Because the second node performs the interference measurement as scheduled by the first node, when the first node needs the second node to perform the interference measurement, the first node may directly send the first measurement configuration to the second node.

However, the first node does not learn whether the second node enables space division multiplexing or when the second node enables space division multiplexing. Therefore, in another embodiment, the second node may send a measurement configuration request to the first node after determining to schedule the third node to send the signal. The measurement configuration request carries a time-frequency resource location that is configured by the second node and at which the third node sends the signal as scheduled. After receiving the measurement configuration request, the first node determines, based on the time-frequency resource location at which the third node sends the signal, that the second node receives, at the time-frequency resource location at which the third node sends the signal, the reference signal sent by the first node, to determine the first measurement configuration. After completing the first measurement configuration, the first node sends the first measurement configuration to the second node.

That the second node obtains the second measurement configuration from the first node is similar. In an embodiment, the first node directly sends the second measurement configuration to the second node. In another embodiment, the first node receives a measurement configuration request sent by the second node, generates a second measurement configuration based on the measurement configuration request, and then sends the second measurement configuration to the second node. Details are not described again.

The method 200 for reporting a measurement result of interference measurement in this application is described above. According to the method 200, a parent node (for example, an IAB node or a donor base station) may learn that a measurement result that is of interference measurement and that is reported by a child node (for example, an IAB node or UE) is obtained through measurement performed with space division multiplexing enabled, or is obtained through measurement performed with space division multiplexing disabled, to manage interference of the child node.

Actually, in the foregoing method 200, the second node uses the reporting mechanism of the L1 measurement to report the measurement result of the interference measurement to the first node by using an uplink signal (for example, a PUCCH or a PUSCH).

In Manner 1, the measurement result of the interference measurement may be reported periodically, aperiodically (aperiodic), or semi-persistently (semi-persistence). In an embodiment, during periodic reporting, the measurement result may be sent by using a PUCCH. During aperiodic reporting, the measurement result may be sent by using a PUSCH. During semi-persistent reporting, the measurement result may be sent by using a PUCCH as indicated in a MAC-CE, or may be sent by using a PUSCH as indicated in DCI.

Manner 2

A child node sends a measurement report to a parent node (or a donor base station), where the measurement report includes one or more measurement results of interference measurement. The child node adds identification information to the measurement report, for the parent node (or the donor base station) to learn a mode of the interference measurement corresponding to each of the one or more measurement results in the measurement report.

The scenario in FIG. 2 is also applicable to the L3 measurement. After the second node completes the interference measurement in the first mode and/or the interference measurement in the second mode to obtain the measurement result, the second node sends a measurement report to the first node, where the measurement report carries the measurement result. The measurement report further carries identification information, to indicate a mode of the interference measurement corresponding to the measurement result in the measurement report. For example, the first node and the second node reach the following agreement: a first identifier corresponds to the measurement result of the interference measurement in the first mode and a second identifier corresponds to the measurement result of the interference measurement in the second mode. When the second node sends the measurement report to the first node by using the reporting mechanism of the L3 measurement, the measurement report includes the measurement result, and at the same time, identification information may be further added to the measurement report to indicate that the measurement result included in the measurement report corresponds to the first mode or the second mode. Alternatively, the measurement report may include a plurality of measurement results, some measurement results correspond to the first mode, and some measurement results correspond to the second mode. Identification information carried in the measurement report is used to indicate that each of the plurality of measurement results corresponds to the first mode or the second mode.

Specifically, after completing the interference measurement, the second node adds the identification information to a MeasResults information element in the measurement report, to indicate a mode of the interference measurement corresponding to the measurement result in the measurement report. Alternatively, the second node may add the identification information to a MeasResults information element in RRC signaling. This is not limited in this embodiment of this application.

In the foregoing embodiment of Manner 2, the second node adds the identification information to the measurement report, to indicate a mode of the interference measurement corresponding to each of the one or more measurement results in the measurement report.

It should be understood that the embodiment in which the first node configures, in the RRC signaling, the association relationship between a report configuration and a measurement resource in Manner 1 is also applicable to Manner 2.

Therefore, in another embodiment, the first node adds identification information to a report configuration, and the identification information is used to specify a mode of interference measurement of a measurement result that a measurement report corresponding to a measurement ID associated with the report configuration is used to report. For example, the first node and the second node reach the following agreement: a first identifier corresponds to the first mode of the interference measurement and a second identifier corresponds to the second mode of the interference measurement. The second node obtains the report configuration from the first node. If the report configuration carries the first identifier, it indicates that the measurement report corresponding to the measurement ID associated with the report configuration is specifically used to report the measurement result of the interference measurement in the first mode. If the report configuration carries the second identifier, it indicates that the measurement report corresponding to the measurement ID associated with the report configuration is specifically used to report the measurement result of the interference measurement in the second mode.

In an embodiment, a mode of interference measurement of a measurement result that a measurement report corresponding to a measurement ID associated with a report configuration is used to report may be alternatively stipulated in a protocol.

1. One Measurement Resource is Associated with a Plurality of Report Configurations.

If the second node enables space division multiplexing, the second node performs the interference measurement in the first mode and the interference measurement in the second mode on the measurement resource. The second node learns of, based on identification information carried in each report configuration, a mode of interference measurement whose measurement result needs to be included in a measurement report corresponding to a measurement ID associated with the report configuration. For example, a first report configuration in the plurality of report configurations carries a first identifier, and a second report configuration carries a second identifier. Then, the second node determines that a measurement report corresponding to a measurement ID associated with the first report configuration needs to include the measurement result of the interference measurement in the first mode, and a measurement report corresponding to a measurement ID associated with the second report configuration needs to include the measurement result of the interference measurement in the second mode.

If the second node does not enable space division multiplexing, the second node does not report the measurement result of the interference measurement in the first mode. This reporting manner is equivalent to event-triggered reporting.

In an embodiment, when the second node enables space division multiplexing, the second node reports, in a measurement report corresponding to a measurement ID associated with a report configuration carrying the first identifier, the actual measurement result of the interference measurement in the first mode. If the second node does not enable space division multiplexing, the second node reports 0 in a measurement report corresponding to a measurement ID associated with a report configuration carrying the first identifier, to implicitly indicate that there is no space division multiplexing interference.

2. A Plurality of Measurement Resources are Associated with One Report Configuration.

In an embodiment, the first node may specify a measurement resource (marked as a first measurement resource) used for the interference measurement in the first mode and a measurement resource (marked as a second measurement resource) used for the interference measurement in the second mode in the plurality of measurement resources.

If the second node enables space division multiplexing, the second node performs the interference measurement in the first mode on the first measurement resource, to obtain a first measurement result. The second node sends a measurement report to the first node based on the report configuration, where the measurement report includes the first measurement result. The second node performs the interference measurement in the second mode on the second measurement resource, to obtain a second measurement result. The second node sends the measurement report to the first node based on the report configuration, where the measurement report includes the second measurement result.

If the second node does not enable space division multiplexing, the second node performs the interference measurement in the second mode on the second measurement resource, to obtain the second measurement result. The second node sends a measurement report to the first node based on the report configuration, where the measurement report includes the second measurement result.

That the second node sends the measurement report to the first node based on the report configuration means that the second node sends the measurement report to the first node based on a reporting criterion in the report configuration. The measurement report complies with a report format, a reporting period, and the like defined in the report configuration.

In Manner 2, a measurement result of interference measurement may be periodically reported or reported as triggered by an event.

It is known that a MAC-CE includes eight bits, and it may be designed that each of the eight bits corresponds to one report configuration. For example, if a bit is set to 0, it indicates that a report configuration corresponding to the bit is deactivated (deactivation) reporting, or if a bit is set to 1, it indicates that a report configuration corresponding to the bit is activated (activation) reporting.

It should be noted that in all embodiments of this application, values that are set for the indication field, the bit, the identification information, and the like are merely used as examples, and definitely, other values may be alternatively set, or another setting manner may be used. This is not limited in this application.

In an embodiment, after the first node learns a time-frequency resource location that is configured by the second node and at which the third node sends the signal, the first node schedules a fourth node to perform interference measurement at the time-frequency resource location.

Herein, the fourth node includes a downstream IAB node of the first node, or UE served by the first node.

Further, after completing the interference measurement, the fourth node sends a measurement result of the interference measurement to the first node. The first node forwards the measurement result of the fourth node to the second node, so that the second node manages and controls signal sending scheduling on the third node.

In an embodiment, when the first node needs the fourth node to perform interference measurement on a space division multiplexing interference source, the first node may first send a scheduling request to the second node, where the scheduling request is used to request the second node to schedule the third node to send the signal, so that the first node schedules the fourth node to perform the interference measurement at the time-frequency resource location at which the third node sends the signal.

The foregoing describes, in detail, the method 200 for reporting a measurement result of interference measurement in this application. The following describes an apparatus for reporting a measurement result of interference measurement in this application.

Figure 6:
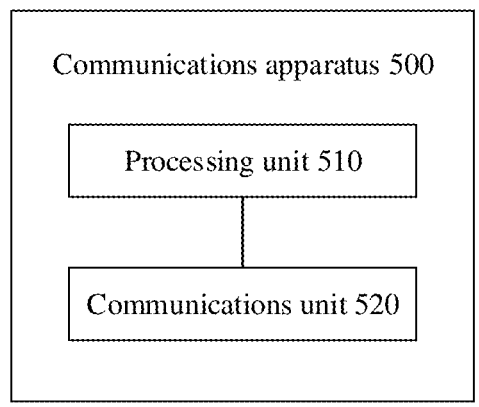
FIG. 6 is a schematic diagram of a communications apparatus 500 according to this application.

FIG. 6 is a schematic structural block diagram of a communications apparatus 500 according to this application. As shown in FIG. 6, the apparatus 500 includes a processing unit 510 and a communications unit 520.

The processing unit 510 is configured to perform interference measurement to obtain one or more measurement results, where the interference measurement includes interference measurement in a first mode and/or interference measurement in a second mode, the interference measurement in the first mode includes that the communications apparatus 500 receives a reference signal sent by a first node and a signal sent by a third node, to perform the interference measurement, the interference measurement in the second mode includes that the communications apparatus 500 receives the reference signal sent by the first node, to perform the interference measurement, the first node is a parent node of the communications apparatus 500, and the third node is a child node of the communications apparatus 500.

The communications unit 520 is configured to send an uplink signal to the first node, where the uplink signal includes the one or more measurement results, the uplink signal further includes an indication field, and the indication field is used to indicate a mode of interference measurement corresponding to each of the one or more measurement results.

In an embodiment, the communications apparatus 500 may correspond to the second node in the method 200 for reporting a measurement result of interference measurement in this application and each embodiment thereof. The units included in the communications apparatus 500 are configured to implement corresponding operations and/or processes performed by the second node in the method 200 and each embodiment thereof.

For example, the processing unit 510 is further configured to perform the step of scheduling the third node to send the signal in some or all time units in a first measurement resource, the step of determining, based on first identification information, second identification information, or third identification information carried in a report configuration, a mode of interference measurement corresponding to the report configuration, and the like in the method embodiment. The communications unit 520 is further configured to perform step 240 of receiving a measurement configuration from the first node in FIG. 3. The communications unit 520 is further configured to perform the step of receiving a first measurement configuration from the first node, the step of sending a first uplink signal to the first node, the step of sending a second uplink signal to the first node, the step of receiving a second measurement configuration from the first node, the step of sending a third uplink signal to the first node, the step of sending a fourth uplink signal to the first node, the step of sending a measurement configuration request to the first node, and the like in the method embodiment.

In an embodiment, the communications apparatus 500 may be alternatively a chip or an integrated circuit configured in the second node.

In an embodiment, the communications unit 520 may include a receiving unit and a sending unit.

In an embodiment, the processing unit 510 may be a processor, and the communications unit 520 may be a transceiver. The transceiver may include a transmitter and a receiver, and have both a receiving function and a sending function.

In an embodiment, the communications unit 520 may be alternatively an input/output interface or an input/output circuit.

Figure 7:
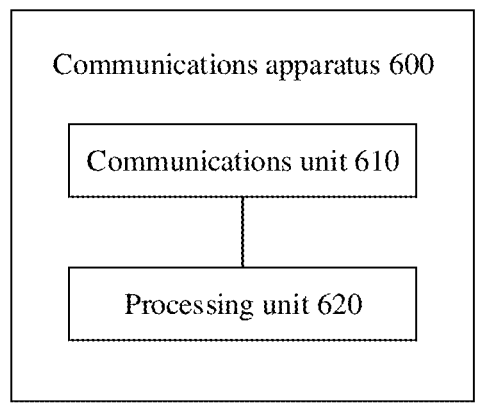
FIG. 7 is a schematic diagram of a communications apparatus 600 according to this application.

FIG. 7 is a schematic structural block diagram of a communications apparatus 600 according to this application. As shown in FIG. 7, the communications apparatus 600 includes a communications unit 610 and a processing unit 620.

The communications unit 610 is configured to receive an uplink signal from a second node, where the uplink signal includes one or more measurement results, the uplink signal further includes an indication field, the indication field is used to indicate a mode of interference measurement corresponding to each of the one or more measurement results, the mode of the interference measurement includes a first mode and/or a second mode, the interference measurement in the first mode includes that the second node receives a reference signal sent by the communications apparatus 600 and a signal sent by a third node, to perform the interference measurement, the interference measurement in the second mode includes that the second node receives the reference signal sent by the communications apparatus 600, to perform the interference measurement, the communications apparatus 600 is a parent node of the second node, and the third node is a child node of the second node.

The processing unit 620 is configured to determine, based on the indication field, the mode of the interference measurement corresponding to each of the one or more measurement results.

In an embodiment, the communications apparatus 600 may correspond to the first node in the method 200 for reporting a measurement result of interference measurement in this application and each embodiment thereof. The units included in the communications apparatus 600 are configured to implement corresponding operations and/or processes performed by the first node in the method 200 and each embodiment thereof.

For example, the communications unit 610 is further configured to perform the step of sending a first measurement configuration to the second node, the step of receiving a first uplink signal from the second node, the step of receiving a second uplink signal from the second node, the step of sending a second measurement configuration to the second node, the step of receiving a third uplink signal from the second node, the step of receiving a fourth uplink signal from the second node, the step of receiving a measurement configuration request from the second node, and the like in the method embodiment. The processing unit 620 is further configured to perform the step of determining the first measurement configuration based on a time-frequency resource location that is carried in the measurement configuration request and at which the third node sends the signal, the step of determining the second measurement configuration, and the like.

In an embodiment, the communications apparatus 600 may be alternatively a chip or an integrated circuit configured in the first node.

In an embodiment, the communications unit 610 may include a receiving unit and a sending unit. The communications unit 610 may be alternatively referred to as a transceiver unit.

In an embodiment, the communications unit 610 may be a transceiver. The transceiver may include a transmitter and a receiver, and have both a receiving function and a sending function. Optionally, the processing unit 620 may be a processor.

In an embodiment, the communications unit 610 may be alternatively an input/output interface or an input/output circuit.

The apparatus 500 corresponds to the second node in the method embodiment, the apparatus 600 corresponds to the first node in the method embodiment, and the corresponding units of the apparatuses perform corresponding steps in the method. For example, the communications unit performs sending and receiving steps in the method embodiment, and other steps than sending and receiving may be performed by the processing unit. The communications unit may be alternatively referred to as a transceiver unit. The transceiver unit includes a sending unit and a receiving unit, and has both a sending function and a receiving function.

Figure 8:
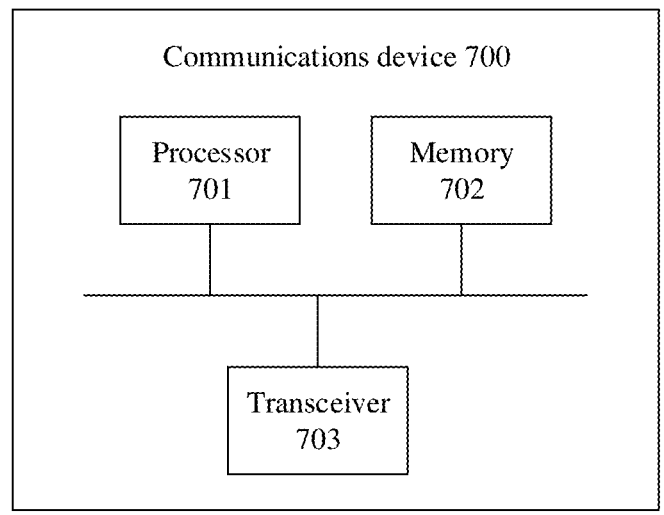
FIG. 8 is a schematic structural diagram of a communications device 700 according to this application.

FIG. 8 is a schematic structural diagram of a communications device 700 according to this application. As shown in FIG. 8, the communications device 700 includes one or more processors 701, one or more memories 702, and one or more transceivers 703. The processor 701 is configured to control the transceiver 703 to receive and send signals, the memory 702 is configured to store a computer program, and the processor 701 is configured to invoke the computer program from the memory 702 and run the computer program, to perform corresponding processes and/or operations performed by the second node in the method 200 for reporting a measurement result of interference measurement in this application and each embodiment thereof.

For example, the communications device 700 may correspond to the second node in the method embodiment. Specifically, the processor 701 of the communications device 700 may correspond to the processing unit 510 in FIG. 6, and the transceiver 703 may correspond to the communications unit 520 in FIG. 6.

For example, the processor 701 is configured to support the second node in performing step 210 in FIG. 3. The processor 701 is further configured to perform the step of scheduling a third node to send a signal in some or all time units in a first measurement resource, the step of determining, based on first identification information, second identification information, or third identification information carried in a report configuration, a mode of interference measurement corresponding to the report configuration, and the like in the method embodiment. The transceiver 703 is further configured to perform step 220 of sending an uplink signal to a first node, and step 240 of receiving a measurement configuration from the first node in FIG. 3. The transceiver 703 is further configured to support the second node in performing the step of receiving a first measurement configuration from the first node, the step of sending a first uplink signal to the first node, the step of sending a second uplink signal to the first node, the step of receiving a second measurement configuration from the first node, the step of sending a third uplink signal to the first node, the step of sending a fourth uplink signal to the first node, the step of sending a measurement configuration request to the first node, and the like in the method embodiment.

Figure 9:
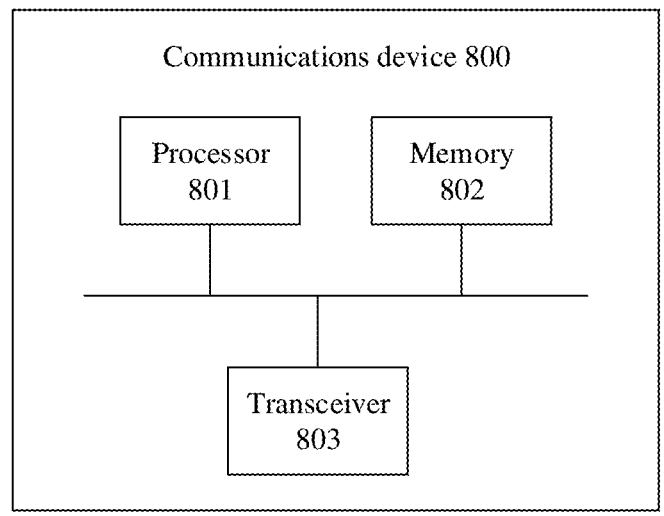
FIG. 9 is a schematic structural diagram of a communications device 800 according to this application.

FIG. 9 is a schematic structural diagram of a communications device 800 according to this application. As shown in FIG. 9, the communications device 800 includes one or more processors 801, one or more memories 802, and one or more transceivers 803. The processor 801 is configured to control the transceiver 803 to receive and send signals, the memory 802 is configured to store a computer program, and the processor 801 is configured to invoke the computer program from the memory 802 and run the computer program, to perform corresponding processes and/or operations performed by the first node in the method 200 for reporting a measurement result of interference measurement in this application and each embodiment thereof.

For example, the transceiver 803 of the communications device 800 may correspond to the communications unit 610 in FIG. 7, and the processor 801 may correspond to the processing unit 620 in FIG. 7.

For example, the transceiver 803 is configured to support the first node in performing step 220 of receiving an uplink signal from a second node, and step 240 of sending a measurement configuration to the second node in FIG. 3. The transceiver 803 is further configured to support the first node in performing the step of sending a first measurement configuration to the second node, the step of receiving a first uplink signal from the second node, the step of receiving a second uplink signal from the second node, the step of sending a second measurement configuration to the second node, the step of receiving a third uplink signal from the second node, the step of receiving a fourth uplink signal from the second node, the step of receiving a measurement configuration request from the second node, and the like in the method embodiment. The processor 801 is configured to support the first node in performing step 230 in FIG. 3. The processor 801 is further configured to support the first node in performing the step of determining the first measurement configuration based on a time-frequency resource location that is carried in the measurement configuration request and at which a third node sends a signal, the step of determining the second measurement configuration, and the like in the method embodiment.

Figure 10:
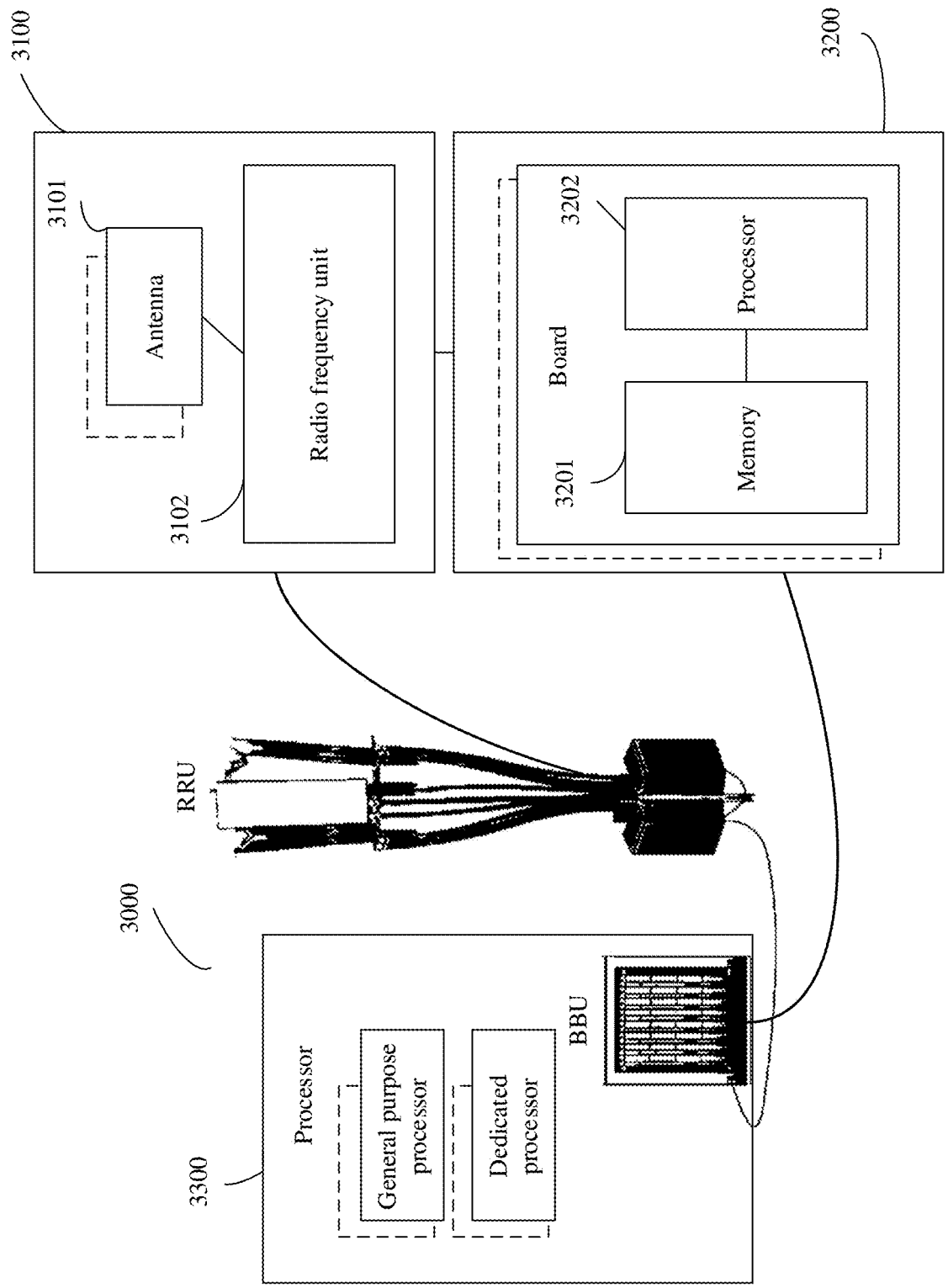
FIG. 10 is a schematic structural diagram of a communications device 3000 according to this application.

In an embodiment, when the first node in the method 200 is a donor base station (donor), for a possible structure of the donor base station, refer to FIG. 10.

FIG. 10 is a schematic structural diagram of a communications device 3000 according to this application. As shown in FIG. 10, the communications device 3000 may include one or more radio frequency units, for example, a remote radio unit (RRU) 3100, and one or more baseband units (BBU). The baseband unit may be alternatively referred to as a digital unit (DU) 3200. The RRU 3100 may be referred to as a transceiver unit. In an embodiment, the transceiver unit 3100 may be alternatively referred to as a transceiver, a transceiver circuit, a device with transceiver, or the like, and may include at least one antenna 3101 and a radio frequency unit 3102. In an embodiment, the transceiver unit 3100 may include a receiving unit and a sending unit. The receiving unit may correspond to a receiver (or referred to as a receiver circuit), and the sending unit may correspond to a transmitter (or referred to as a transmitter circuit). The RRU 3100 is mainly configured to receive and send radio frequency signals and perform conversion between a radio frequency signal and a baseband signal. The BBU 3200 is mainly configured to perform baseband processing, control a base station, and the like. The RRU 3100 and the BBU 3200 may be physically disposed together, or may be physically disposed separately, namely, may be a distributed base station.

The BBU 3200 is a control center of the communications device 3000, and is mainly configured to implement a baseband processing function, for example, channel coding, multiplexing, modulation, and spreading. The BBU is one type of a processor 3300 of the communications device 3000. The communications device 3000 may further include one or more general purpose processors, one or more dedicated processors, and the like. The processor 3300 may also be integrated into a processor or chip.

In an example, the BBU 3200 may include one or more boards, and a plurality of boards together may support a radio access network (for example, an LTE network) of a single access standard, or may respectively support radio access networks (for example, an LTE network, a 5G network, or another network) of different access standards. The BBU 3200 further includes a memory 3201 and a processor 3202. The memory 3201 is configured to store a necessary instruction and data. The processor 3202 is configured to control the communications device 3000 to perform a necessary action, for example, processing physical-layer signaling. The memory 3201 and the processor 3202 may serve one or more boards. In other words, a memory and a processor may be disposed on each board, or a plurality of boards may share a same memory and a same processor. In addition, a necessary circuit may be further disposed on each board.

It should be understood that the communications device 3000 in FIG. 10 can implement various processes of the first node in the method embodiments of FIG. 1 to FIG. 5. Operations and/or functions of the units of the communications device 3000 are respectively used to implement the corresponding processes in the method embodiment. To avoid repetition, detailed descriptions are omitted herein.

The processor 3300 may be configured to perform actions that are implemented internally by a network device and described in the foregoing method embodiments, for example, the step of determining a first measurement configuration and the step of determining a second measurement configuration. The RRU 3100 may be configured to perform an action of performing, by a network device, sending to or receiving from a terminal device in the foregoing method embodiments, for example, perform step 210 and step 230 in the method 200. For details, refer to the descriptions in the foregoing method embodiments. Details are not described herein again.

In addition, this application provides a computer readable storage medium. The computer readable storage medium stores a computer instruction. When the computer instruction is run on a computer, the computer is enabled to perform corresponding operations and/or a processes performed by the second node in the method 200 for reporting a measurement result of interference measurement in the embodiments of this application.

This application further provides a computer program product. The computer program product includes a computer program code. When the computer program code is run on a computer, the computer is enabled to perform corresponding operations and/or processes performed by the second node in the method 200 for reporting a measurement result of interference measurement in the embodiments of this application.

This application further provides a chip, including a processor. The processor is configured to invoke a computer program stored in a memory and run the computer program, to perform corresponding operations and/or processes performed by the second node in the method 200 for reporting a measurement result of interference measurement in the embodiments of this application. In an embodiment, the chip further includes the memory, and the memory is connected to the processor. The processor is configured to read and execute the computer program in the memory. Further, In an embodiment, the chip further includes a communications interface, and the processor is connected to the communications interface. The communications interface is configured to receive data and/or information that needs to be processed, and the processor obtains the data and/or information from the communications interface, and processes the data and/or information. In an embodiment, the communications interface may be an input/output interface, and may specifically include an input interface and an output interface. In an embodiment, the communications interface may be an input/output circuit, and may specifically include an input circuit and an output circuit.

This application provides a computer readable storage medium. The computer readable storage medium stores a computer instruction. When the computer instruction is run on a computer, the computer is enabled to perform corresponding operations and/or processes performed by the first node in the method 200 for reporting a measurement result of interference measurement in the embodiments of this application.

This application further provides a computer program product. The computer program product includes a computer program code. When the computer program code is run on a computer, the computer is enabled to perform corresponding operations and/or processes performed by the first node in the method 200 for reporting a measurement result of interference measurement in the embodiments of this application.

This application further provides a chip, including a processor. The processor is configured to invoke a computer program stored in a memory and run the computer program, to perform corresponding operations and/or processes performed by the first node in the method 200 for reporting a measurement result of interference measurement in the embodiments of this application. In an embodiment, the chip further includes the memory, and the memory is connected to the processor. The processor is configured to read and execute the computer program in the memory. Further, In an embodiment, the chip further includes a communications interface, and the processor is connected to the communications interface. The communications interface is configured to receive data and/or information that needs to be processed, and the processor obtains the data and/or information from the communications interface, and processes the data and/or information. In an embodiment, the communications interface may be an input/output interface, and may specifically include an input interface and an output interface. In an embodiment, the communications interface may be an input/output circuit, and specifically includes an input circuit and an output circuit.

In an embodiment, the memory and the processor in the foregoing embodiments may be units that are physically independent of each other, or the memory and the processor may be integrated together.

In the foregoing embodiments, the processor may be a central processing unit (CPU), a micro-processor, an application-specific integrated circuit (ASIC), one or more integrated circuits configured to control execution of a program of the technical solutions of this application, or the like. For example, the processor may be a digital signal processor device, a microprocessor device, an analog-to-digital converter, a digital-to-analog converter, or the like. The processor may allocate control and signal processing functions of the terminal device or the network device between the devices based on respective functions of the devices. In addition, the processor may have a function of operating one or more software programs, and the software program may be stored in the memory. The functions of the processor may be implemented by hardware, or by hardware executing corresponding software. The hardware or software includes one or more modules corresponding to the functions.

The memory may be a read-only memory (ROM) or another type of static storage device capable of storing static information and an instruction, or a random access memory (RAM) or another type of dynamic storage device capable of storing information and an instruction, or may be an electrically erasable programmable read-only memory (EE-PROM), a compact disc read-only memory (CD-ROM) or other compact disc storage, optical disc storage (including a compact disc, a laser disc, an optical disc, a digital versatile disc, a blue-ray disc, and the like), a magnetic disk storage medium or another magnetic storage device, or any other medium capable of carrying or storing an expected program code in a form of an instruction or a data structure and capable of being accessed by a computer.

In this embodiment of this application, the term "and/or" describes an association relationship for describing associated objects and represents that three relationships may exist. For example, A and/or B may represent the following three cases: Only A exists, both A and B exist, and only B exists. A and B may be in a singular form or a plural form.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the embodiment goes beyond the scope of this application.

In the several embodiments provided in this application, the disclosed system, apparatus, and method may be implemented in other manners. For example, the described apparatus embodiments are merely an example. For example, the module division is merely logical function division and may be other division in actual implementation. For example, a plurality of modules or components may be combined or integrated into another system. For example, a plurality of units or components may be combined or may be integrated into another system, or some features may be ignored, or some features are not executed. In addition, the displayed or discussed mutual couplings or direct couplings or communication connections may be implemented by using some interfaces. The indirect couplings or communication connections between the apparatuses or units may be implemented in electronic, mechanical, or other forms.

The units as separate parts may not be physically separate, and parts displayed as units may not be physical units, may be located in one position, or may be distributed on a plurality of network units. Some or all of the units may be selected based on actual requirements to achieve the objectives of the technical solutions of this application.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific some embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communications device, comprising:
   a processor, configured to perform interference measurement to obtain one or more measurement results, wherein the interference measurement comprises interference measurement in a first mode and/or interference measurement in a second mode, the interference measurement in the first mode comprises that the communications device receives a reference signal sent by a first node and a signal sent by a third node, to perform interference measurement, the interference measurement in the second mode comprises that the communications device receives the reference signal sent by the first node, to perform the interference measurement, the first node is a parent node of the communications device, and the third node is a child node of the communications device; and
   a transceiver, configured to send an uplink signal to the first node, wherein the uplink signal comprises the one or more measurement results, the uplink signal further comprises an indication field, and the indication field is used to indicate a mode of interference measurement corresponding to each of the one or more measurement results.

2. The communications device according to claim 1, wherein the transceiver is further configured to:
   obtain a first measurement configuration from the first node, wherein the first measurement configuration comprises an association relationship between one measurement resource and a plurality of report configurations;

the processor is specifically configured to:

perform the interference measurement in the first mode on the measurement resource to obtain a first measurement result, and/or perform the interference measurement in the second mode on the measurement resource to obtain a second measurement result; and the transceiver is specifically configured to:

send a first uplink signal to the first node based on a first report configuration in the plurality of report configurations, wherein the first uplink signal comprises the first measurement result and a first indication field, and the first indication field is used to indicate that the first measurement result corresponds to the first mode; and/or send a second uplink signal to the first node based on a second report configuration in the plurality of report configurations, wherein the second uplink signal comprises the second measurement result and a second indication field, and the second indication field is used to indicate that the second measurement result corresponds to the second mode.

3. The communications device according to claim 2, wherein the first report configuration comprises first identification information, the first identification information specifies that the first report configuration corresponds to the measurement result of the interference measurement in the first mode, the second report configuration comprises second identification information, and the second identification information specifies that the second report configuration corresponds to the measurement result of the interference measurement in the second mode.

4. The communications device according to claim 1, wherein the transceiver is further configured to:

obtain a second measurement configuration from the first node, wherein the second measurement configuration comprises an association relationship between a plurality of measurement resources and one report configuration;

the processor is specifically configured to:

perform the interference measurement in the first mode on a first measurement resource in the plurality of measurement resources, to obtain a first measurement result, and/or perform the interference measurement in the second mode on a second measurement resource in the plurality of measurement resources, to obtain a second measurement result; and the transceiver is specifically configured to:

send a third uplink signal to the first node based on the report configuration, wherein the third uplink signal comprises the first measurement result and a third indication field, and the third indication field is used to indicate that the first measurement result corresponds to the first mode; and/or send a fourth uplink signal to the first node based on the report configuration, wherein the fourth uplink signal comprises the second measurement result and a fourth indication field, and the fourth indication field is used to indicate that the second measurement result corresponds to the second mode.

5. The communications device according to claim 4, wherein the report configuration carries third identification information, and the third identification information is used to indicate whether the report configuration supports reporting of the measurement result of the interference measurement in the first mode.

6. The communications device according to claim 4, wherein the first measurement resource comprises a plurality of time units, and the processor is further configured to:

before performing the interference measurement in the first mode on the first measurement resource, schedule the third node to send a signal in some or all of the plurality of time units.

7. The communications device according to claim 2, wherein the transceiver is specifically configured to:

send a measurement configuration request to the first node, wherein the measurement configuration request is used to request the first node to configure the first measurement configuration, and the measurement configuration request carries a time-frequency resource location that is configured by the communications device and at which the third node sends the signal as scheduled; and receive the first measurement configuration returned by the first node for the measurement configuration request, wherein the first measurement resource configuration is determined by the first node based on the time-frequency resource location at which the third node sends the signal.

8. A communications device, comprising:

a transceiver, configured to receive, an uplink signal from a second node, wherein the uplink signal comprises one or more measurement results, the uplink signal further comprises an indication field, and the indication field is used to indicate that a mode of interference measurement corresponding to each of the one or more measurement results, wherein the mode of the interference measurement comprises a first mode and/or a second mode, the interference measurement in the first mode comprises that the second node receives a reference signal sent by the communications device and a signal sent by a third node, to perform the interference measurement, the interference measurement in the second mode comprises that the second node receives the reference signal sent by the communications device, to perform the interference measurement, the communications device is a parent node of the second node, and the third node is a child node of the second node; and a processor, configured to determine, based on the indication field, the mode of the interference measurement corresponding to each of the one or more measurement results.

9. The communications device according to claim 8, wherein the transceiver is further configured to:

send a first measurement configuration to the second node, wherein the first measurement configuration comprises an association relationship between one measurement resource and a plurality of report configurations; and the transceiver is specifically configured to:

receive a first uplink signal that is sent by the second node based on a first report configuration in the plurality of report configurations, wherein the first uplink signal comprises a first measurement result and a first indication field, and the first indication field is used to indicate that the first measurement result corresponds to the first mode; and/or receive a second uplink signal that is sent by the second node based on a second report configuration in the plurality of report configurations, wherein the second uplink signal comprises a second measurement result and a second indication field, and the second indication field is used to indicate that the second measurement result corresponds to the second mode.

10. The communications device according to claim 9, wherein the first report configuration comprises first identification information, the first identification information specifies that the first report configuration corresponds to the measurement result of the interference measurement in the first mode, the second report configuration comprises second identification information, and the second identification information specifies that the second report configuration corresponds to the measurement result of the interference measurement in the second mode.

11. The communications device according to claim 9, wherein the transceiver is further configured to:
receive a second measurement configuration from the second node, wherein the second measurement configuration comprises an association relationship between a plurality of measurement resources and one report configuration; and
the transceiver is specifically configured to:
receive a third uplink signal that is sent by the second node based on the report configuration, wherein the third uplink signal comprises a first measurement result and a third indication field, and the third indication field is used to indicate that the first measurement result corresponds to the first mode; and/or
receive a fourth uplink signal that is sent by the second node based on the report configuration, wherein the fourth uplink signal comprises a second measurement result and a fourth indication field, and the fourth indication field is used to indicate that the second measurement result corresponds to the second mode.

12. The communications device according to claim 11, wherein the report configuration carries third identification information, and the third identification information is used to indicate whether the report configuration supports reporting of the measurement result of the interference measurement in the first mode.

13. The communications device according to claim 9, wherein the transceiver is specifically configured to:
receive a measurement configuration request from the second node, wherein the measurement configuration request is used to request the communications device to configure the first measurement configuration, and the measurement configuration request carries a time-frequency resource location that is configured by the communications device and at which the third node sends the signal as scheduled;
the processor is further configured to determine the first measurement configuration based on the time-frequency resource location at which the third node sends the signal; and
the transceiver is specifically configured to send the first measurement configuration.

14. A method for reporting a measurement result of interference measurement, comprising:
performing, by a second node, interference measurement to obtain one or more measurement results, wherein the interference measurement comprises interference measurement in a first mode and/or interference measurement in a second mode, the interference measurement in the first mode comprises that the second node receives a reference signal sent by a first node and a signal sent by a third node, to perform the interference measurement, the interference measurement in the second mode comprises that the second node receives the reference signal sent by the first node, to perform the interference measurement, the first node is a parent node of the second node, and the third node is a child node of the second node; and
sending, by the second node, an uplink signal to the first node, wherein the uplink signal comprises the one or more measurement results, the uplink signal further comprises an indication field, and the indication field is used to indicate a mode of interference measurement corresponding to each of the one or more measurement results.

15. The method according to claim 14, wherein the method further comprises:
obtaining, by the second node, a first measurement configuration from the first node, wherein the first measurement configuration comprises an association relationship between one measurement resource and a plurality of report configurations;
the performing, by a second node, interference measurement to obtain one or more measurement results comprises:
performing, by the second node, the interference measurement in the first mode on the measurement resource to obtain a first measurement result, and/or performing, by the second node, the interference measurement in the second mode on the measurement resource to obtain a second measurement result; and
the sending, by the second node, the uplink signal to the first node, wherein the uplink signal comprises the one or more measurement results, and the uplink signal further comprises an indication field, comprising:
sending, by the second node, a first uplink signal to the first node based on a first report configuration in the plurality of report configurations, wherein the first uplink signal comprises the first measurement result and a first indication field, and the first indication field is used to indicate that the first measurement result corresponds to the first mode; and/or
sending, by the second node, a second uplink signal to the first node based on a second report configuration in the plurality of report configurations, wherein the second uplink signal comprises the second measurement result and a second indication field, and the second indication field is used to indicate that the second measurement result corresponds to the second mode.

16. The method according to claim 15, wherein the first report configuration comprises first identification information, the first identification information specifies that the first report configuration corresponds to the measurement result of the interference measurement in the first mode, the second report configuration comprises second identification information, and the second identification information specifies that the second report configuration corresponds to the measurement result of the interference measurement in the second mode.

17. The method according to claim 14, wherein the method further comprises:
obtaining, by the second node, a second measurement configuration from the first node, wherein the second measurement configuration comprises an association relationship between a plurality of measurement resources and one report configuration;
the performing, by a second node, interference measurement to obtain one or more measurement results comprises:

performing, by the second node, the interference measurement in the first mode on a first measurement resource in the plurality of measurement resources, to obtain a first measurement result, and/or performing, by the second node, the interference measurement in the second mode on a second measurement resource in the plurality of measurement resources, to obtain a second measurement result; and the sending, by the second node, the uplink signal to the first node, wherein the uplink signal comprises the one or more measurement results, and the uplink signal further comprises an indication field, comprising:

sending, by the second node, a third uplink signal to the first node based on the report configuration, wherein the third uplink signal comprises the first measurement result and a third indication field, and the third indication field is used to indicate that the first measurement result corresponds to the first mode; and/or sending, by the second node, a fourth uplink signal to the first node based on the report configuration, wherein the fourth uplink signal comprises the second measurement result and a fourth indication field, and the fourth indication field is used to indicate that the second measurement result corresponds to the second mode.

18. The method according to claim 17, wherein the report configuration carries third identification information, and the third identification information is used to indicate whether the report configuration supports reporting of the measurement result of the interference measurement in the first mode.

19. The method according to claim 17, wherein the first measurement resource comprises a plurality of time units in time domain, and before the performing, by the second node, the interference measurement in the first mode on a first measurement resource, the method further comprises:

scheduling, by the second node, the third node to send a signal in some or all of the plurality of time units.

20. The method according to claim 15, wherein the obtaining, by the second node, a first measurement configuration from the first node comprises:

sending, by the second node, a measurement configuration request to the first node, wherein the measurement configuration request is used to request the first node to configure the first measurement configuration, and the measurement configuration request carries a time-frequency resource location that is configured by the second node and at which the third node sends the signal as scheduled; and receiving, by the second node, the first measurement configuration returned by the first node for the measurement configuration request, wherein the first measurement resource configuration is determined by the first node based on the time-frequency resource location at which the third node sends the signal.

* * * * *